US010131450B2

United States Patent
Hiroshima et al.

(10) Patent No.: US 10,131,450 B2
(45) Date of Patent: Nov. 20, 2018

(54) MACHINING DEVICE

(71) Applicant: MAKITA CORPORATION, Anjo-shi, Aichi (JP)

(72) Inventors: Toru Hiroshima, Anjo (JP); Yuta Kawai, Anjo (JP); Sho Kume, Anjo (JP); Kenji Nose, Anjo (JP); Yuki Wada, Anjo (JP); Naoki Ozawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 112 days.

(21) Appl. No.: 15/141,143

(22) Filed: Apr. 28, 2016

(65) Prior Publication Data

US 2017/0021466 A1    Jan. 26, 2017

(30) Foreign Application Priority Data

Jul. 21, 2015  (JP) .................................. 2015-144321

(51) Int. Cl.
| | |
|---|---|
| *B23Q 11/00* | (2006.01) |
| *B64F 5/60* | (2017.01) |
| *B23Q 11/06* | (2006.01) |
| *B23D 47/00* | (2006.01) |
| *B27B 9/00* | (2006.01) |

(52) U.S. Cl.
CPC .............. *B64F 5/60* (2017.01); *B23D 47/005* (2013.01); *B23Q 11/06* (2013.01); *B27B 9/00* (2013.01)

(58) Field of Classification Search
CPC .... B23Q 47/005; B23Q 11/06; B23Q 11/0096
See application file for complete search history.

(56) References Cited

U.S. PATENT DOCUMENTS

| | | | | |
|---|---|---|---|---|
| 4,137,806 A | * | 2/1979 | Segal ................... | B23D 47/005 144/251.1 |
| 4,323,145 A | * | 4/1982 | Allen ................... | B23D 47/005 181/209 |
| 4,660,448 A | * | 4/1987 | Bies ................... | B23Q 11/0078 144/251.1 |
| 5,386,894 A | * | 2/1995 | Barca ................... | B23D 47/005 188/379 |

FOREIGN PATENT DOCUMENTS

| | | |
|---|---|---|
| JP | 2000-073310 A | 3/2000 |
| JP | 2006-315243 A | 11/2006 |

* cited by examiner

*Primary Examiner* — Omar Flores Sanchez
(74) *Attorney, Agent, or Firm* — Oliff PLC

(57) ABSTRACT

A machining device may include an electric motor, a blade rotatably driven by the electric motor for machining a workpiece, and a blade cover configured to surround the blade. A resonance sound reduction device may be disposed at the blade cover and may reduce air vibration generated by the rotation of the blade.

14 Claims, 14 Drawing Sheets

MACHINING DEVICE

CROSS-REFERENCE TO RELATED APPLICATIONS

This application is based upon and claims priority to Japanese Patent Application Serial No. 2015-144321 filed on Jul. 21, 2016, the contents of which are incorporated in their entirety herein by reference.

BACKGROUND

Technical Field

The invention generally relate to a machining device, such as a cutting device that may include a circular blade rotatably driven for performing a cutting operation or a grooving operation of a workpiece, such as an aluminum workpiece, by a predetermined depth.

Related Art

Japanese Laid-Open Patent Publication No. 2000-073310 (JP-A-2000-073310) discloses a technique for reducing noise that may be generated by the rotation of a blade of a cutting device that may be used for cutting a concrete floor surface and an asphalt road surface.

However, in a structure for covering the blade disclosed in the above publication, a polyurethane resin material is disposed in a sound adsorbing space formed around the blade. This arrangement may lead to an increase in a manufacturing cost of the cutting device. Other than cutting devices of a type disclose in the publication, blade covers (called "blade cases") have been generally incorporated for covering blades of various machining devices, such as a grooving device, a portable circular saw and a miter saw. Also for these machining devices, there has been a problem of generation of unpleasant sound, such as sound of "pea." It has been considered that such noise or abnormal sound may be generated when the frequency of air vibration generated by the rotation of the blade at a specific rotational speed within the cover becomes to a value equal to or near a natural system frequency determined by various factors, such as the weight of the blade, the shape of the cover, etc.

In view of the above, there is a need in the art for a technique of reducing nose or abnormal sound generated by the rotation of a blade within a blade cover of a machining device, without leading to a substantial increase in a manufacturing cost of the machining device.

SUMMARY

In one embodiment, a machining device may include an electric motor, a blade rotatably driven by the electric motor for machining a workpiece, a blade cover configured to surround the blade, and a resonance sound reduction device disposed at the blade cover and configured to reduce air vibration generated by the rotation of the blade.

Because the resonance sound reduction device may reduce air vibration generated by the rotation of the blade, it may be possible to prevent or reduce generation of noise or abnormal sound (resonance sound).

The resonance sound reduction device may be further configured to reduce amplitudes at anti-nodes of a waveform of the air vibration. With this arrangement, it may be possible to efficiently prevent or reduce generation of resonance sound.

The resonance sound reduction device may include at least one convex portion, such as a linear projection that may be a rib.

Additionally or alternatively, the resonance sound reduction device may include a combination of a plurality of differently shaped portions. At least two of the differently shaped portions may be arranged to cross each other. For example, the at least two of the differently shaped portions may be arranged to cross orthogonally each other. Additionally or alternatively, at least two of the differently shaped portions may have different heights in a direction toward the blade.

The machining device may further include a spindle rotatably driven by the electric motor. The blade may be attached to the spindle, so that the blade rotates about an axis of the spindle. In this case, the differently shaped portions may include a front side portion and a rear side portion positioned on a front side and a rear side, respectively, with respect to the spindle axis.

Additionally or alternatively, the machining device may further include a door configured to be capable of opening and closing an access opening formed in the blade cover. A lock device may lock the door at a closing position for closing the access opening. The lock device may include an operation member and a biasing device. The operation member may be rotatable relative to the door about a rotational axis and may be movable relative to the door along a movement axis that may be the rotational axis. The biasing device may bias the operation member in a first direction along the movement axis. The lock device may unlock the door when the operation member is rotated after being depressed in a second direction opposite to the first direction.

In this way, for unlocking the door, the operation member is necessary to be moved in the second direction after being rotated. Therefore, it may be possible to prevent accidental or unintentional unlocking of the door. As a result, it may be possible to improve the functionality of the lock device.

DETAILED DESCRIPTION OF THE PRESENTLY PREFERRED EMBODIMENTS

Figure 1:
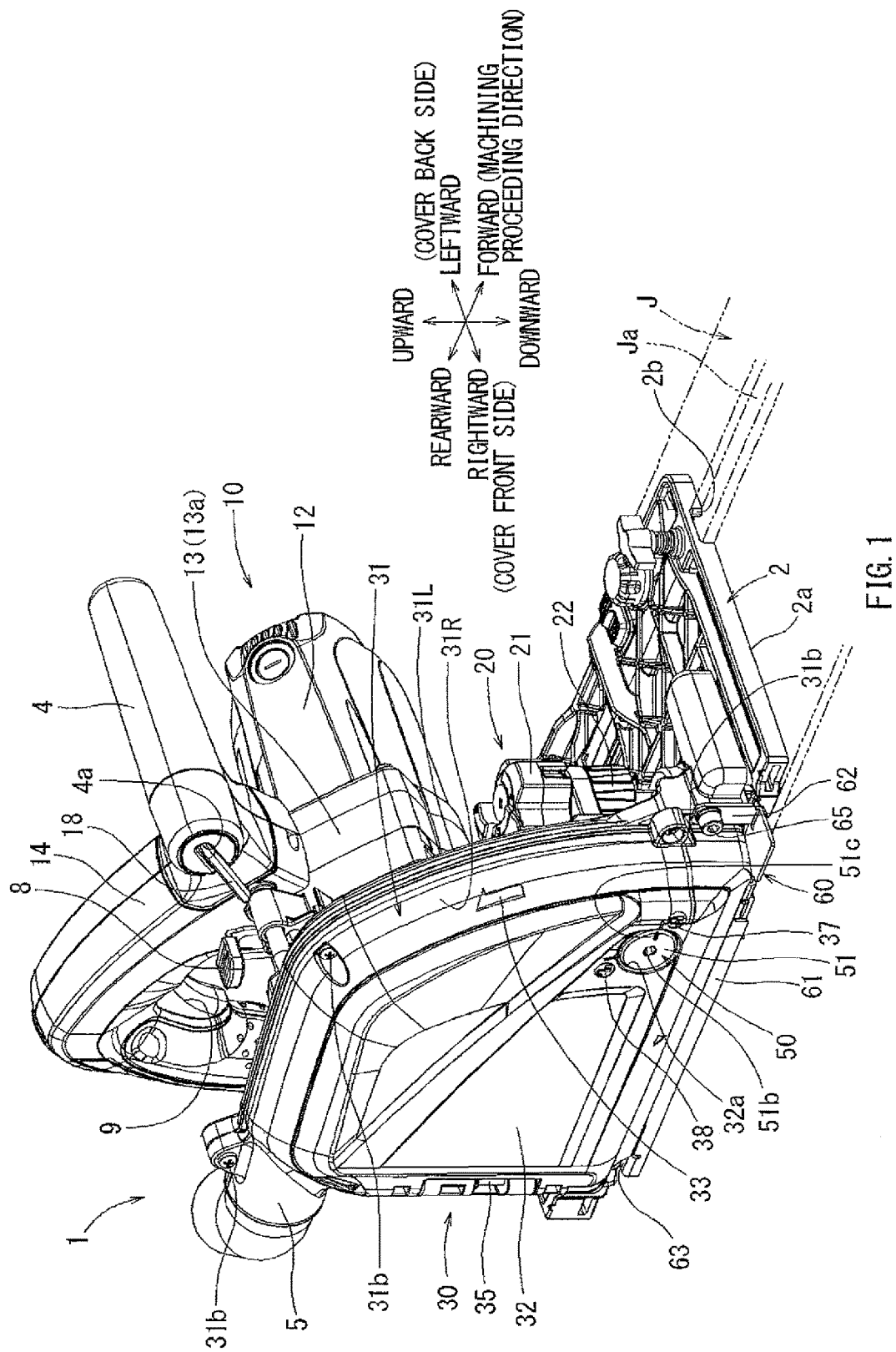
FIG. 1 is a perspective view as viewed from a diagonally forward right side of a machining device according to a representative embodiment and showing a door of a blade cover in a closing position.

A machining device according to a representative embodiment will now be described with reference to the drawings. In the following description, with regard to forward and rearward directions for members and constructions of the machining device, a direction in which the machining device moves for performing a machining operation (hereinafter called a "machining proceeding direction") may be determined as the forward direction. Leftward and rightward directions may be determined with reference to a position where a user is positioned for operating the machining device. Further, in the following description, the left side with respect to a blade cover will be also called as a "cover back side", and the right side with respect to the blade cover will be also called as a "cover front side." In this representative embodiment, a machining device 1 may be configured as a hand-held groove cutter that may have a relatively small size to be held by a hand(s) of the user and may be used for forming a groove in a workpiece that may be a metal workpiece, such as an aluminum workpiece or an aluminum composite workpiece.

As shown in FIGS. 1 to 4, the machining device 1 may generally include a base 2 for directly or indirectly contacting an upper surface of a workpiece W, and a machining device main body 10 disposed on an upper side of the base 2 and supported by the base. The base 2 may have a generally rectangular flat-plate shape. The lower surface of the base 2 may serve as a contact surface 2a for directly or indirectly contacting with an upper surface of the workpiece W. For example, if the workpiece W is an aluminum workpiece, an elongated ruler J may be placed on the upper surface of the workpiece W and the machining device 1 may be placed on the elongated ruler J for performing a groove forming operation of the workpiece W. In such a case, the contact surface 2a of the base 2 may not directly contact the upper surface of the workpiece W but may indirectly contact the workpiece W with an intervention of the elongated ruler J. For this purpose, a rail receiving portion 2b may be provided on the lower surface of the base 2 for fitting or engagement with a guide rail Ja of the elongated ruler J. A blade cover 30 for covering or surrounding a blade 11A may be disposed on the right side portion of the upper surface of the base 2 opposite to the contact surface 2a and may extend upward therefrom. The blade cover 30 may be fixedly attached to the upper surface of the base 2.

Figure 4:
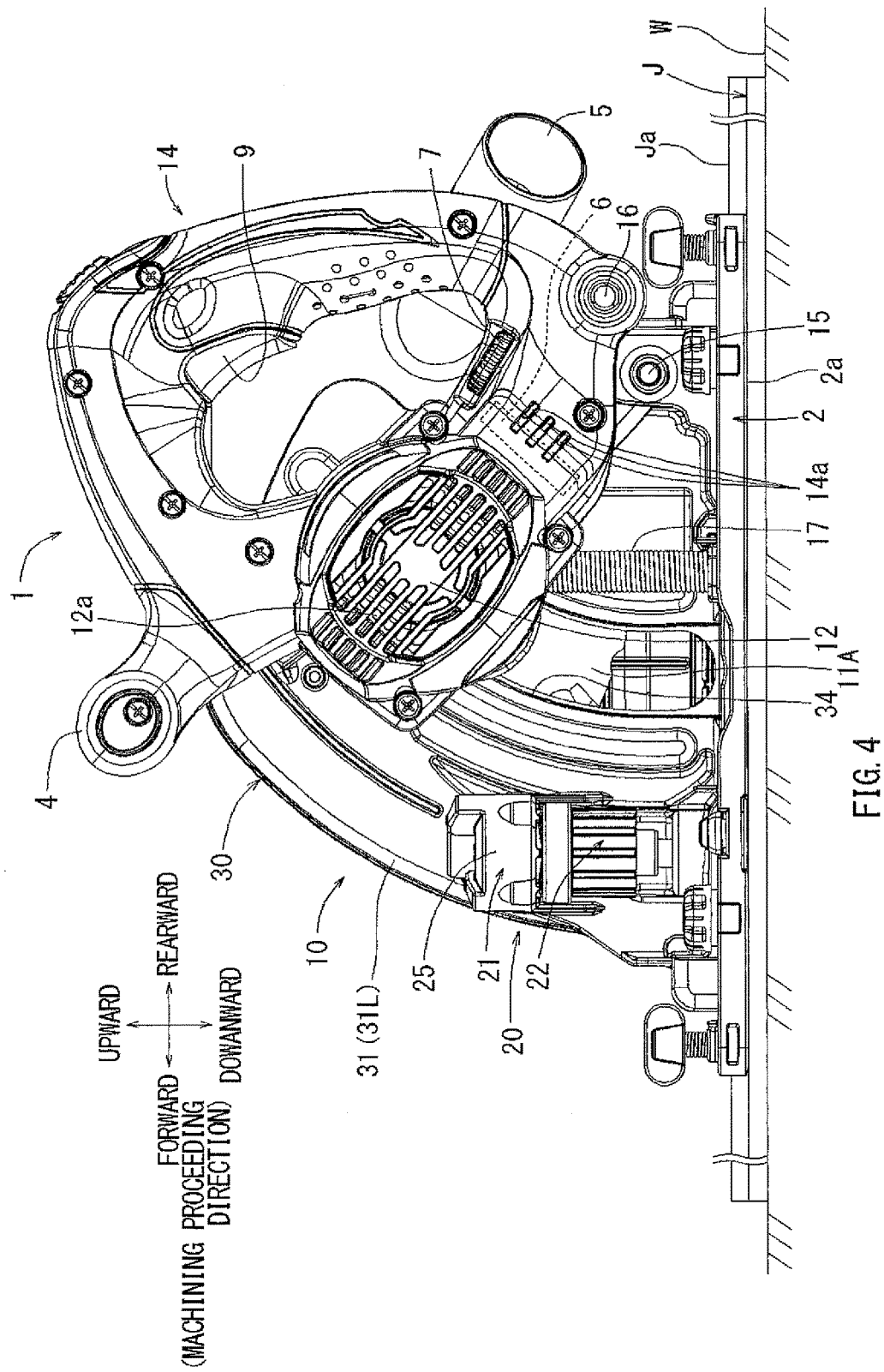
FIG. 4 is a back surface side view of the machining device as viewed in a direction indicated by arrow (IV) in FIG. 2.

As shown in FIG. 4, the machining device main body 10 may be vertically pivotally supported on the upper surface of the base 2 via a body support shaft 15. A compression spring 17 may be interposed between the machining device main body 10 and the base 2, so that the machining device main body 10 may be normally biased in an upward pivoting direction. The lower portion of the blade 11A may protrude downward beyond the contact surface 2a of the base 2 as the machining device main body 10 pivots downward about the body support shaft 15 against the biasing force of the compression spring 17. Therefore, when the user presses the machining device main body 10 downward while an electric motor 12 of the machining device main body 10 is started to rotate the blade 11A, the lower portion of the blade 11A protruding downward beyond the contact surface 2a may cut into the upper surface of the workpiece W to form a groove, such as a V-shaped groove, in the upper surface of the workpiece W.

The machining device main body 10 may include the electric motor 12 serving as a drive device for rotating the blade 11A, a reduction gear section 13 including a gear case 13a and a reduction gear mechanism (not shown) disposed in the gear case 13a for reducing the rotational speed of the electric motor 12, and a handle 14 that can be grasped by a hand(s) of the user. The electric motor 12 may be connected to the left side of the gear case 13a of the reduction gear section 13. The rotation of the electric motor 12 may be transmitted to a spindle 3 after being reduced in speed by the reduction gear mechanism of the reduction gear section 13. The spindle 3 may extend into the internal space of the blade cover 30 though a circular-arc shaped insertion slot 34 formed in the left side wall of the blade cover 30. The blade 11A may be attached to an end portion of the spindle 3 protruding into the internal space of the blade cover 30. The blade 11A may be fixed to the spindle 3 by tightening a cutter fixing screw 3a that can threadably engage the protruding end portion of the spindle 3. The blade 11A can be removed from the spindle 3 by loosening the cutter fixing screw 3a. A hexagonal wrench 18 may be used for tightening and loosening the cutter fixing screw 3a. The hexagonal wrench 18 may be detachably held by a front grip 4. More specifically, the hexagonal wrench 18 may be removably inserted into a retention hole 4a formed in the right side portion of the front grip 4.

Figure 2:
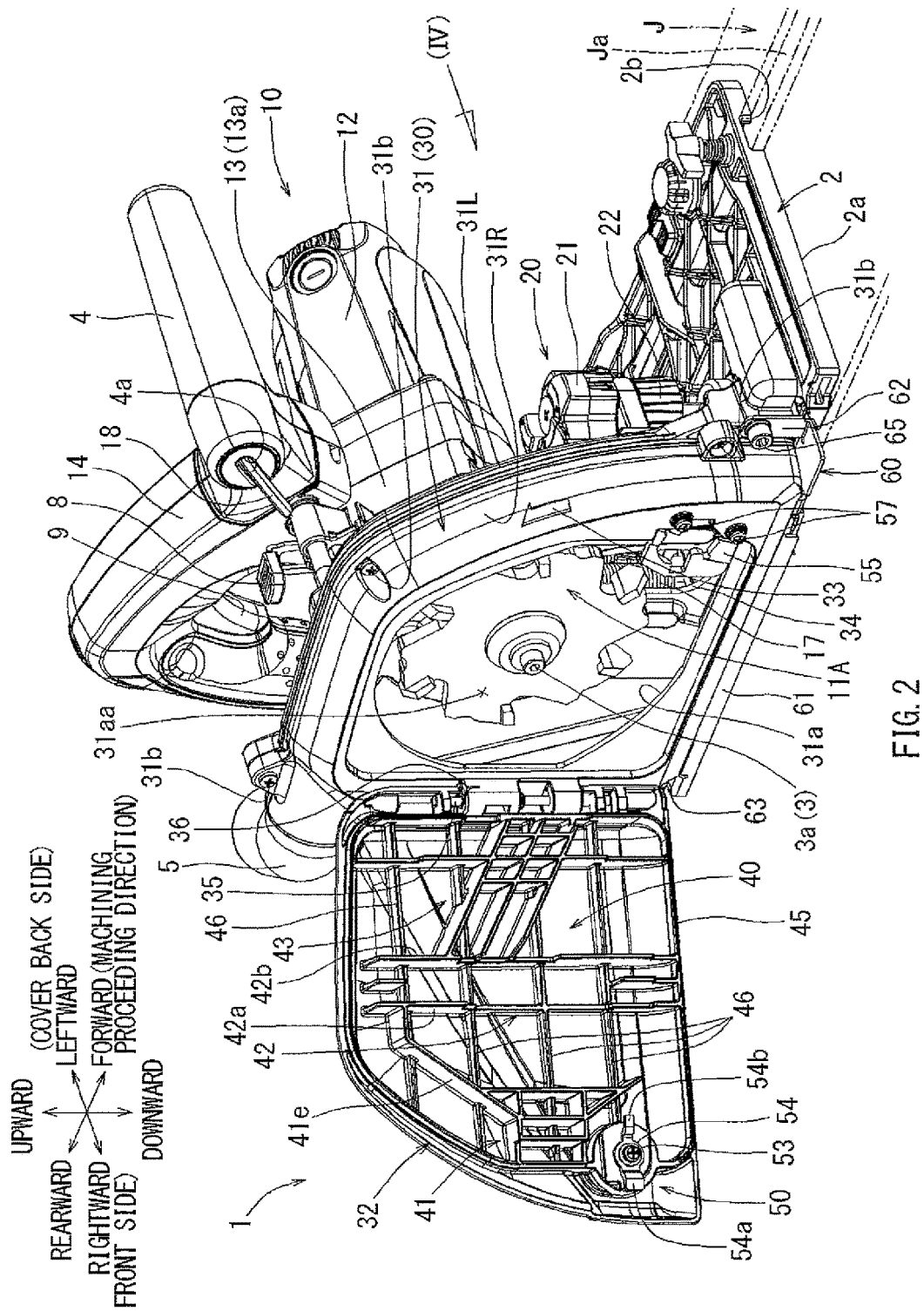
FIG. 2 is a perspective view similar to claim 1 but showing the door in an open position.
Figure 3:
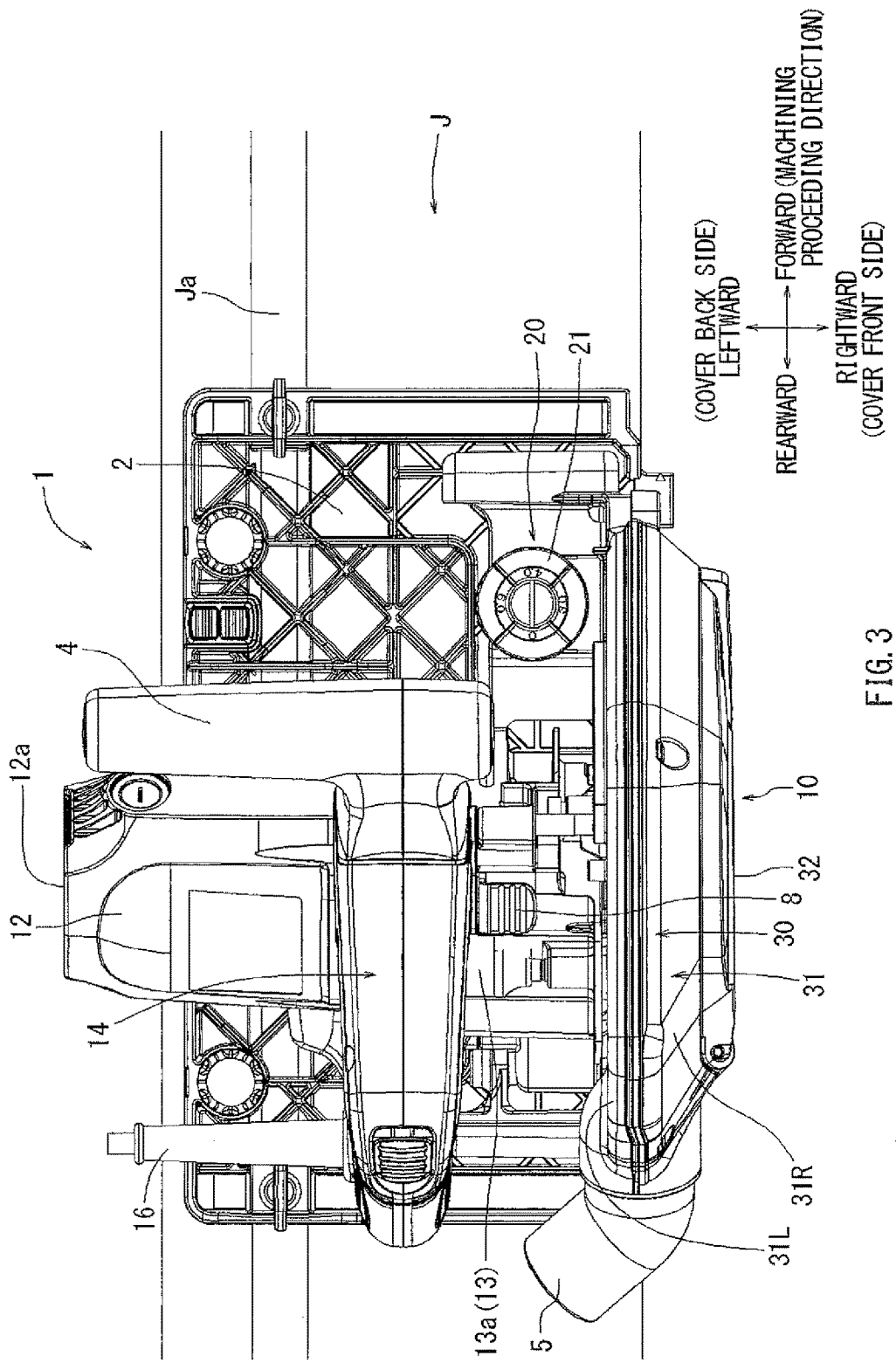
FIG. 3 is a plan view of the machining device.
Figure 5:
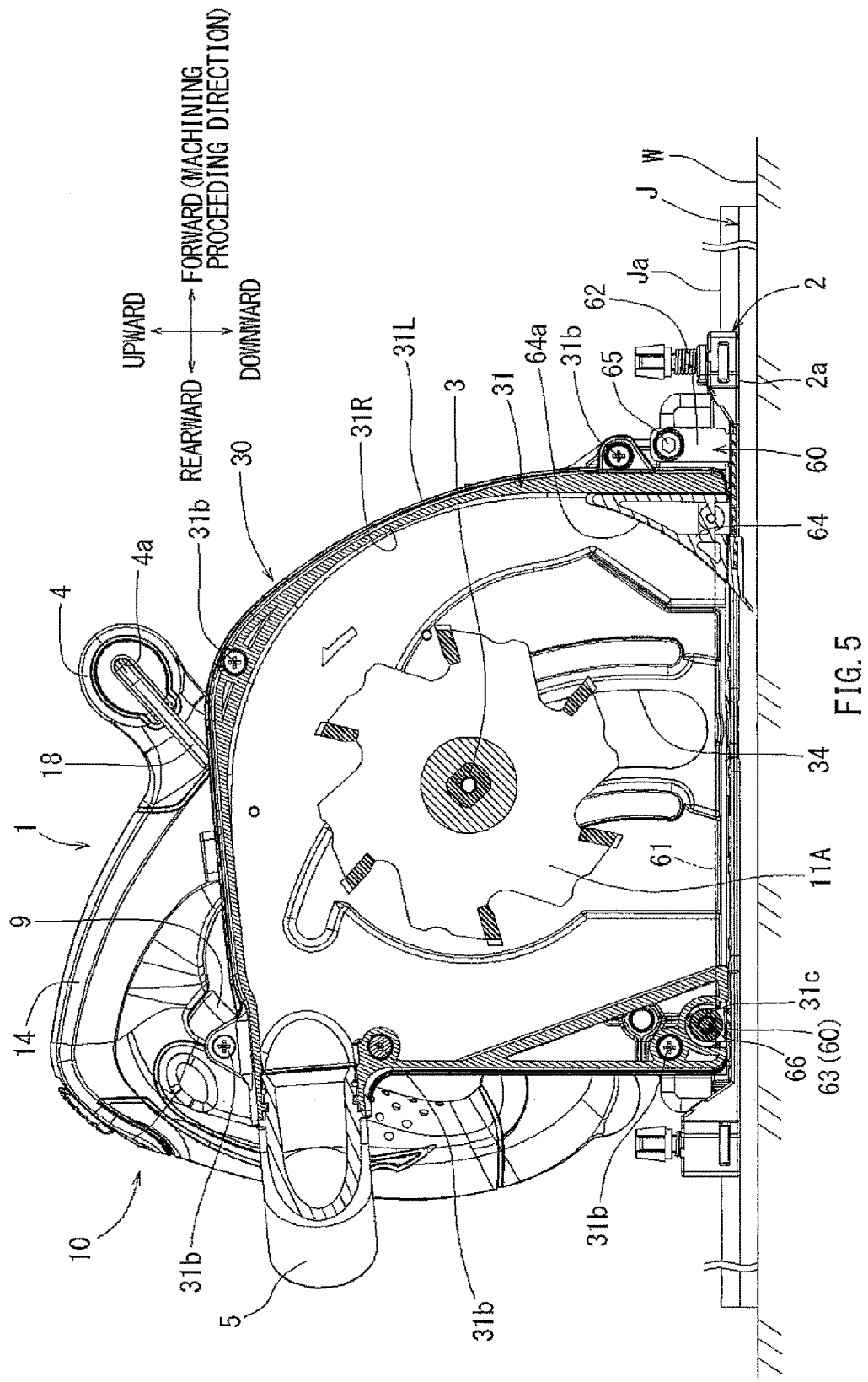
FIG. 5 is a front surface side view of the machining device with the blade cover and a blade shown in a vertical sectional view.

As shown in FIGS. 2 and 5, the blade 11A may be a groove-forming cutter (also called a groove cutting blade) that may have a relatively small diameter, such as a diameter of 18 mm. As the blade 11A, it may be also possible to use a circular saw blade, a diamond wheel, a grinding wheel, etc. The electric motor 12 may be an AC motor powered by a commercially available AC power source. In this connection, a power cord 16 for supplying the AC power to the electric motor 12 may be drawn into the rear portion of the handle 14.

The handle 14 may have a shape of a part of a loop. One end of the handle 14 may be connected to the upper portion of the gear case 13a, and an opposite end of the handle 14 may be connected to the rear portion of the gear case 13a. A trigger-type switch lever 9 may be disposed at the inner circumferential side (lower surface side) of the handle 14. The switch lever 9 may be arranged such that the user can pull the switch lever 9 while the user grasps the handle 14. The electric motor 12 may start to rotate the blade 11A as the user pulls the switch lever 9.

Figure 6:
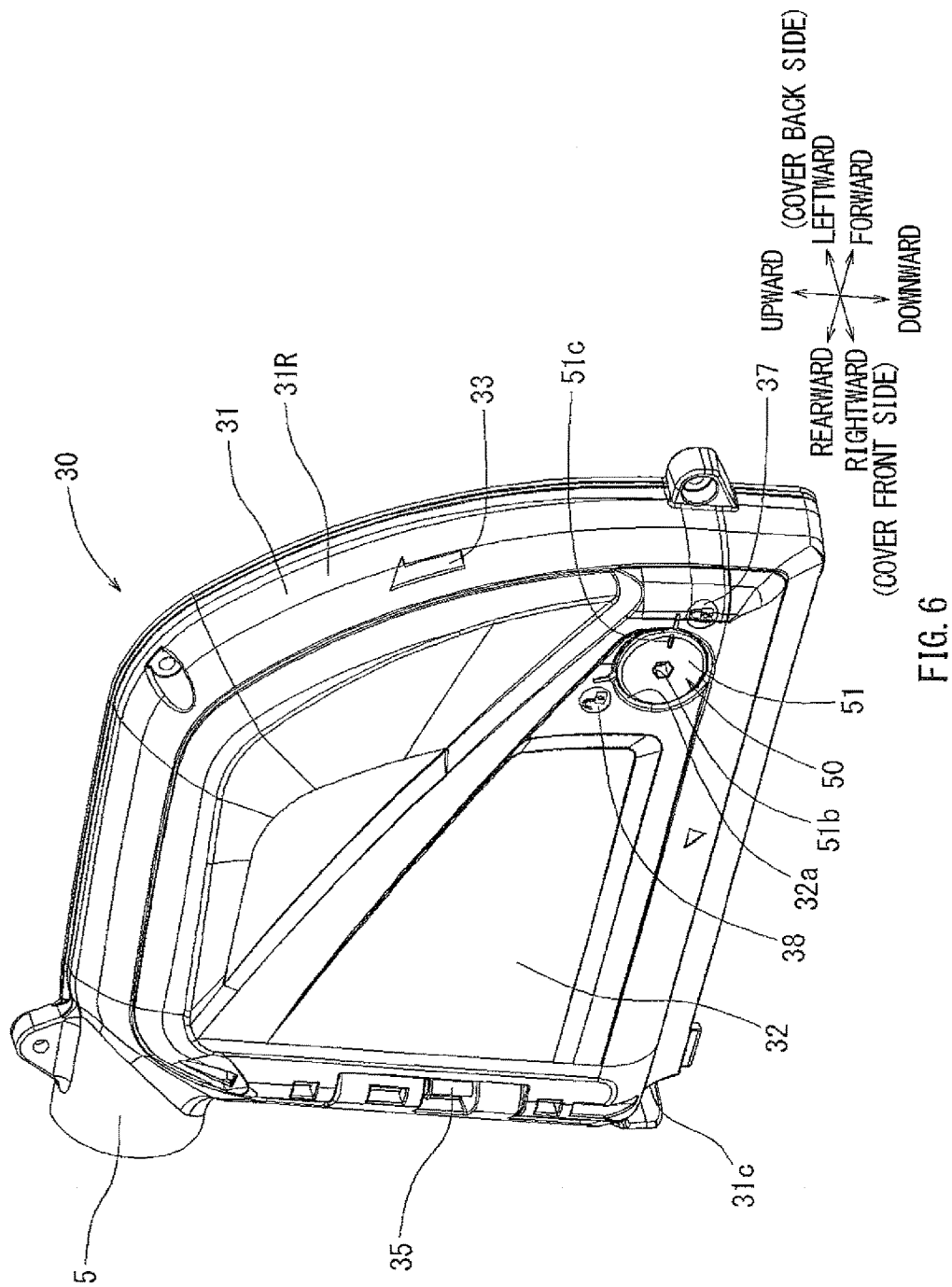
FIG. 6 is a perspective view of the blade cover showing the door in the closing position.

A controller 6 may be disposed within the rear portion of the handle 14 (see FIG. 6). The controller 6 may control mainly the operation of the electric motor 12. A dial 7 may be attached to the handle 14 at a position on the upper side of the controller 6. Manually rotating the dial 7 may increase or decrease the rotational speed of the electric motor 12. Air inlet holes 14a for introduction of the external air may be formed in the handle 14a at a position on a lateral side of the controller 6.

Also, air inlet holes 12a for introduction of the external air may be formed in the left side surface of a motor housing of the electric motor 12. Although not shown in the drawings, a cooling fan may be disposed within the motor housing of the electric motor 12. Therefore, as the electric motor 12 starts, the fan may rotate, so that the external air may be introduced into the motor housing via the air inlet holes 12*a* and also into the handle 14 via the air inlet holes 14*a*. The external air introduced into the motor housing via the air inlet holes 12*a* may flow rightward within the motor housing of the electric motor 12 for cooling mainly coiled wires of a rotor of the electric motor 12. The external air introduced into the handle 14 via the air inlet holes 14*a* may flow within the handle 14 for cooling the controller 6. The stream of the external air introduced into the motor housing via the air inlet holes 12*a* and the stream of the external air introduced into the handle 14 via the air inlet holes 14*a* may be merged at a position near the right side end of the electric motor 12. The merged external air may then be discharged to the outside via air exhaust holes (not shown) formed in a lateral side surface of the gear case 13*a* of the reduction gear section 13.

The front grip 4 may be disposed at the front portion of the handle 14 so as to extend leftward therefrom. Therefore, the user can grasp the handle 14 with one hand and can grasp the front grip 4 with the other hand. In this way, the user can grasp and hold the machining device main body 10 with both hands, so that the operation of moving the machining device main body 10 in the machining proceeding direction can be easily performed. As described previously, the retention hole 4*a* may be formed in the right side portion of the front grip 4 for detachably holding the hexagonal wrench 18.

As shown in FIGS. 1 and 2, a spindle lock lever 8 may be disposed at the upper portion of the reduction gear section 13 on the right side of the handle 14. The spindle lock lever 8 may be operated for locking the output shaft of the electric motor 12 against its rotation. By preventing rotation of the output shaft of the electric motor 12 through the operation of the spindle lock lever 8, the spindle 3 may be also locked against its rotation. Therefore, the operation for exchanging the blade 11A with a new blade or another type of blade can be conveniently performed.

A stopper device 20 may be disposed near the front portion of the upper surface of the base 2. The stopper device 20 may serve to determine a lower movement end position (i.e., a lowermost position) of the machining device main body 10. The lower movement end position may define a cutting depth of the blade 11A into the workpiece W (i.e., a depth of a groove formed in the workpiece W by the blade 11A). In this embodiment, the protruding distance of the blade 11A from the lower surface of the base 2 (more specifically, the protruding distance after reduction of the thickness of the elongated ruler J) may correspond to the depth of the groove to be formed. Therefore, the depth of the groove can be adjusted by changing the lower movement end position of the machining device main body 10. The stopper device 20 may include a first adjusting mechanism 21 and a second adjusting mechanism 22. The first adjusting mechanism 21 may adjust the lower movement end position in a stepwise manner. The second adjusting mechanism 22 may serve as a fine adjustment mechanism that allows a fine adjustment in the vertical direction of the lower movement end position adjustment by the first adjusting mechanism 21.

The blade cover 30 may include a cover main body 31 and a door 32 each molded with aluminum or any other suitable metal material. The cover main body 31 may be fixedly attached along the right side edge of the base 2. The cover main body 31 may include a right side portion 31R and a left side portion 31L. Fixing screws 31*b* may join the right side portion 3R and the left side portion 31L together. The right side portion 31R may be positioned on the right side (i.e., the cover front side) of the blade 11A. The left side portion 31L may be positioned on the left side (i.e., the cover back side) of the blade 11A. The lower surface of the blade cover 30 may have a lower opening for allowing passage of the blade 11A. The lower portion of the blade 11A may extend downward through the lower opening of the blade cover 30 and may protrude for cutting into the workpiece W.

The door 32 may be attached to the right side of the right side portion 31R of the cover main body 31 via a hinge 35, so that the door 32 can pivot rightward (i.e., a cover front side direction) and leftward (i.e., a cover back side direction) about the hinge 35 for opening and closing an access opening 31*aa* that may be formed in the right side portion 31R of the blade cover 30. The internal space of the blade cover 30 may be opened to the outside via the access opening 31*aa*. A torsion spring 36 attached to the hinge 35 may normally bias the door 32 in the rightward direction (i.e., the cover front side direction or an opening direction of the door 32). In this way, the access opening 31*aa* of the cover main body 31 may be opened as shown in FIG. 2 as the door 32 pivots rightward about the hinge 35. An inwardly extending shield wall portion 31*a* may be formed along the inner circumference of the access opening 31*aa* of the right side portion 31R of the cover main body 31. The size of the access opening 31*aa* may be determined to be large enough to enable visual inspection of the whole of the blade 11A by the user. In this way, when the door 32 is opened, the blade 11A may be exposed to the outside via the access opening 31*aa*, so that the operation for replacement of the blade 11A with a new blade or another type of blade can be easily quickly performed.

An arrow mark 33 may be marked on or affixed to the blade cover 30 for indicating the rotational direction of the blade 11A. In this embodiment, the rotational direction may be a counterclockwise direction as viewed from the right side (i.e., the cover front side) of the blade cover 30. A dust collection duct 5 may be connected to or formed with the rear portion of the blade cover 30. The dust collection duct 5 may be designed so as to be connectable with a dust collection box or a hose of a dust collector (not shown). Therefore, dust or debris generated and blown upward by the rotating blade 11A during the machining operation may be collected into the dust collection box or the dust collector via the dust collection duct 5.

In this embodiment, the blade cover 30 may be provided with a specific device that can reduce noise or abnormal sound generated by the rotation of the blade 11A. More specifically, a resonance sound reduction device 40 may be disposed on the inner circumferential side of a sealing rib 45, which will be described later, of the door 32. The resonance sound reduction device 40 may reduce air vibration that may be generated within the blade cover 30 by the rotation of the blade 11A. In this embodiment, the resonance sound reduction device 40 may include a first soundproof portion 41, a second soundproof portion 42 and a third soundproof portion 43. Each of the first, second and third soundproof portions 41, 42 and 43 may include a plurality of soundproof ribs that are different in their lengths, heights (protruding distances) or arrangements in order to appropriately reduce amplitudes of a waveform of air vibration generated by the rotation of the blade 11A. It has been known that a sound wave is a compressional wave (longitudinal wave), and therefore, the wave of the air vibration generated by the rotating blade 11A may be a compressional wave. The generated wave may be fine at nodes and may be coarse at anti-nodes. In many cases, within the blade cover 30, the node may be located at a position proximal to the spindle 3, and the anti-nodes may be located at a position proximal to an intermediate position between the front end of the blade cover 30 and the spindle 3 and at a position proximal to an intermediate position between the rear end of the blade cover 30 and the spindle 3.

Figure 7:
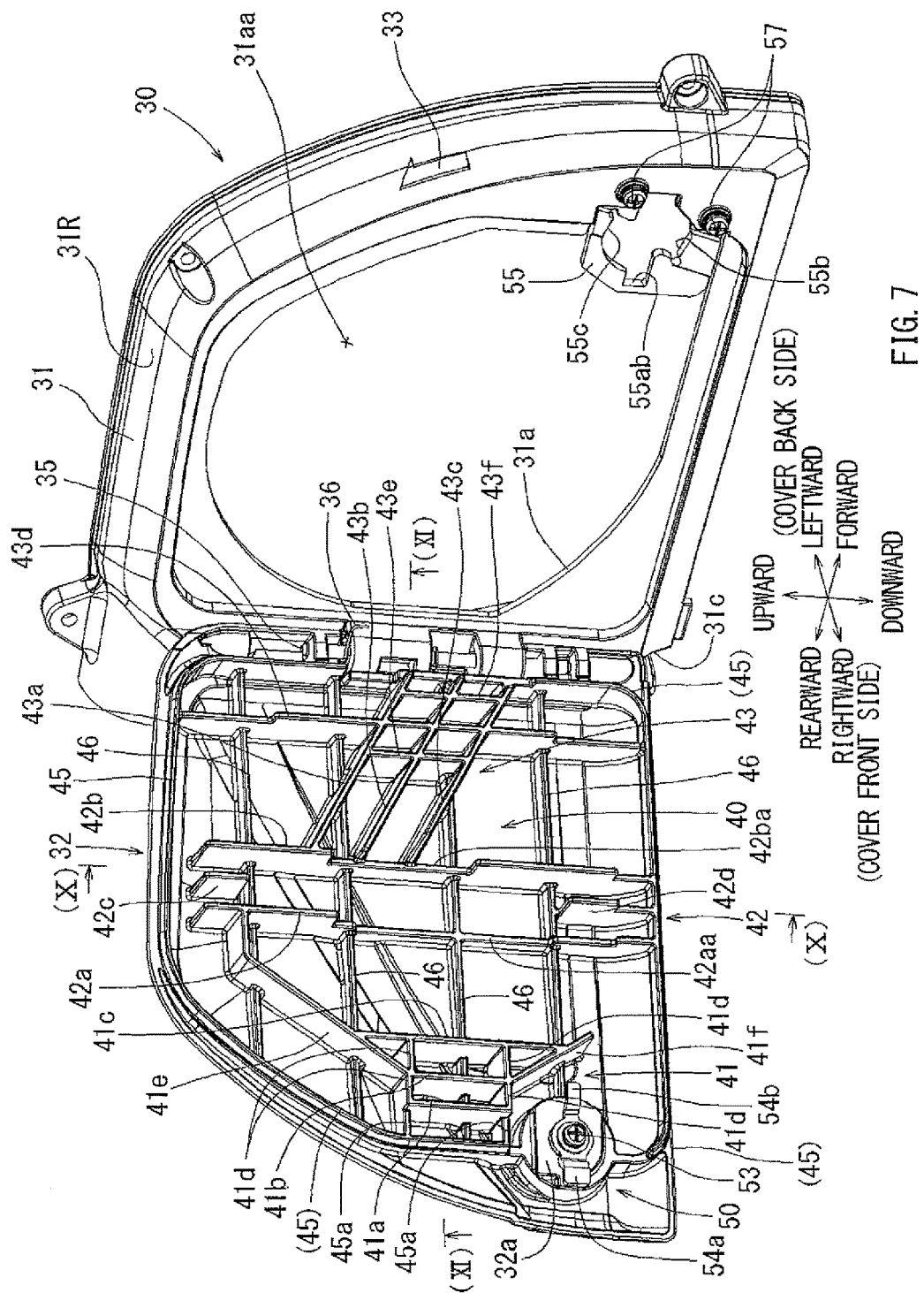
FIG. 7 is a perspective view similar to FIG. 6 but showing the door in the open position.

As shown in FIGS. 2 and 7, the sealing rib 45 may be disposed at the inner surface of the door 32 along a substantially entire peripheral edge thereof. The seal rib 45 may contact the cover main body 31 when the door 32 is closed. The reinforcing ribs 46 may protrude from the inner surface of the door 32 by a first protruding distance. Further, four horizontal reinforcing ribs 46 may be formed on the inner surface of the door 32 on the inner circumferential side of the sealing rib 45 so as to extend parallel to each other in the vertical direction. The reinforcing ribs 46 may serve to improve mainly the rigidity of the door 32. Each of the reinforcing ribs 46 may protrude from the inner surface of the door 32 by a second protruding distance.

In addition to the reinforcing ribs 46, the first to third soundproof devices 41 to 43 may be disposed at the inner surface of the door 32 on the inner circumferential side of the sealing rib 45. The first soundproof device 41 may be disposed at the front portion of the inner surface of the door 32 in the forward-rearward direction (the right portion of the inner surface when the door 32 is opened as shown in FIGS. 2 and 7). The second soundproof device 42 may be disposed at a substantially central portion of the inner surface of the door 32 in the forward-rearward direction. The third soundproof device 43 may be disposed at a rear portion of the inner surface of the door 32 (the left portion of the inner surface when the door 32 is opened as shown in FIGS. 2 and 7). In the following description, the terms "front" and "rear" regarding the positions of the first to third soundproof devices 41 relative to the inner surface of the door 32 may be used with reference to the position of the door 32 when the door 32 is closed. The first to third soundproof devices 41 to 43, the sealing rib 45 and the reinforcing ribs 46 may be formed integrally with the door 32 at the time of molding the door 32. The first protruding distance of the sealing rib 45 may be set to be larger than the second protruding distance of the reinforcing ribs 46.

Figure 11:
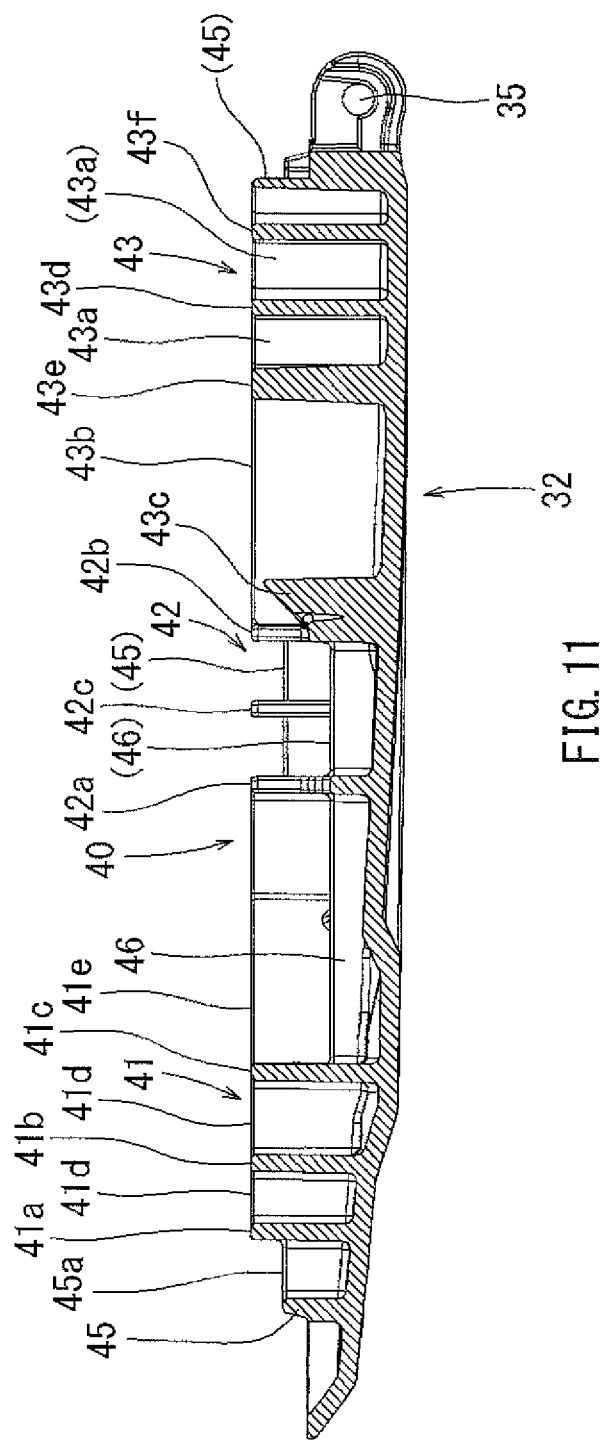
FIG. 11 is a sectional view taken along line (XI)-(XI) in FIG. 7 showing a horizontal sectional view of the door.

The first soundproof device 41 may include three vertical ribs 41a, 41b and 41c. As shown in FIG. 11, the three vertical ribs 41a, 41b and 41c may protrude from the inner surface of the door 32 by a same protruding distance and may extend parallel to each other so as to be orthogonal to the reinforcing ribs 46. The vertical ribs 41a and 41b positioned on the front side (right side in FIGS. 2 and 7) may extend by a same vertical length. The upper and lower ends of the vertical rib 41c positioned on the rear side (left side in FIGS. 2 and 7) may be connected to the sealing rib 45 via respective extension ribs 45a. The protruding distance of the extension ribs 45a may be the same as the first protruding distance of the sealing rib 45.

A vertical length of the vertical rib 41c positioned on the rear side (left side in FIGS. 2 and 7) of the vertical rib 41b may be longer than that of the vertical ribs 41a and 41b positioned on the front side. Horizontal ribs 41d may connect the upper ends of the vertical rib 41a and the vertical rib 41b, the lower ends of the vertical rib 41a and the vertical rib 41b, the upper end of the vertical rib 41b and the upper portion of the vertical rib 41c, and the lower end of the vertical rib 41b and the lower portion of the vertical rib 41c. Further, an upper oblique rib 41e may connect the upper end of the vertical rib 41b and the upper end of the vertical rib 41c, and a lower oblique rib 41f may connect the lower end of the vertical rib 41b and the lower end of the vertical rib 41c. More specifically, the upper oblique rib 41e may extend obliquely upward from the upper end of the vertical rib 41b, and the lower oblique rib 41f may extend obliquely downward from the lower end of the vertical rib 41b. The length of the lower oblique rib 41f may be shorter than the length of the upper oblique rib 41e.

The three vertical ribs 41a, 41b and 41c, the four horizontal ribs 41d and the two oblique ribs 41e may protrude from the inner surface of the door 32 by a same protruding distance (hereinafter called a third protruding distance). In this embodiment, the third protruding distance may be set to be larger than the first protruding distance of the sealing rib 45 and the extension ribs 45a. Further, in this embodiment, the third protruding distance may be set such that the protruding ends of the ribs 41a to 41e are spaced from the blade 11A by about 14 mm. In the following description, the third protruding distance may be also called as a maximum protruding distance, and the second protruding distance of the reinforcing ribs 46 may be called as a minimum protruding distance. Further, the first protruding distance of the sealing rib 45 and the extension ribs 45a may be set to be smaller than the third protruding distance (maximum protruding distance). Therefore, the first protruding distance may be also called as an intermediate protruding distance. In this embodiment, the intermediate distance may be set such that the protruding ends of the rib 45 and the ribs 45a are spaced from the blade 11A by 24.6 mm.

The second soundproof device 42 may include a pair of vertically elongated vertical ribs 42a and 42b that extend parallel to each other and also parallel to the vertical ribs 41a, 41b and 41c of the first soundproof device 41. The upper ends of the vertical ribs 42a and 42b may not be connected to the sealing rib 45 but may be spaced therefrom. The lower ends of the vertical ribs 42a and 42b may be connected to the sealing rib 45 at a same vertical height.

Figure 10:
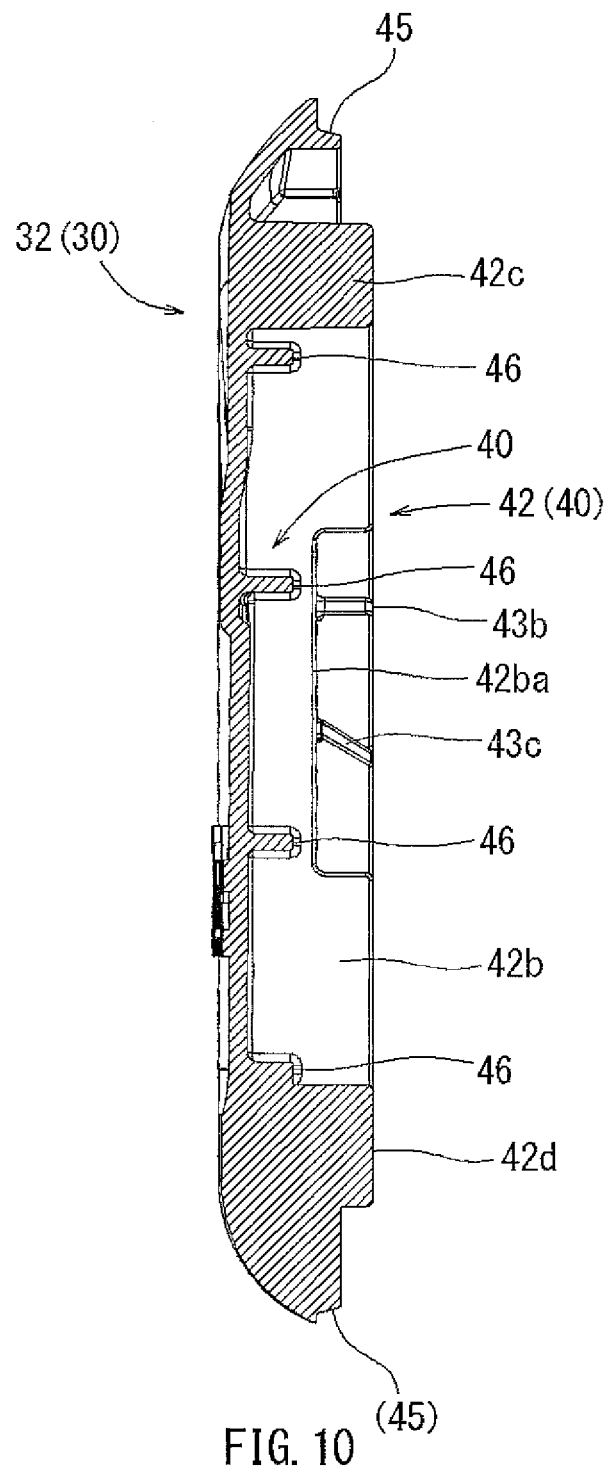
FIG. 10 is a sectional view taken along line (X)-(X) in FIG. 7 showing a vertical sectional view of the door.

The oblique rib 41e of the first soundproof device 41 may be connected to the upper portion of the vertical rib 42a positioned on the front side (right side in FIGS. 2 and 7). The vertical ribs 42a and 42b may protrude from the inner surface of the door 32 by a same protruding distance as the third protruding distance (i.e., the maximum protruding distance) of the vertical ribs 41a, 41b and 41c and the oblique ribs 41e and 41f of the first soundproof device 41. The vertical rib 42a may have a recessed portion 42aa formed at a substantially middle position in the vertical direction. Therefore, the recessed portion 42aa may have a smaller protruding distance than the protruding distance (i.e., the third protruding distance) of the remaining portion of the vertical rib 42a positioned on opposite sides of the recessed portion 42aa. Similarly, the vertical rib 42b may have a recessed portion 42ba formed at a substantially middle position in the vertical direction. The recessed portion 42ba may have a smaller protruding distance than the protruding distance (i.e., the third protruding distance) of the remaining portion of the vertical rib 42b positioned on opposite sides of the recessed portion 42ba. The recessed portions 42aa and 42ba may serve as relief portions for avoiding interference of the vertical ribs 42a and 42b with the cutter fixing screw 3a or any other elements used for mounting the blade 11A to the spindle 3. In this embodiment, the vertical length of the recessed portion 42aa of the vertical rib 42a positioned on the front side (right side in FIGS. 2 and 7) may be longer than the vertical length of the recessed portion 42ba of the rear side vertical rib 42b. In addition, the protruding distance of the recessed portion 42aa may be smaller than the protruding distance of the recessed portion 42ba. An upper auxiliary rib 42c may be disposed at a position between the upper ends of the vertical ribs 42a and 42b, and a lower auxiliary rib 42d may be disposed at a position between the lower ends of the vertical ribs 42a and 42b. As shown in FIG. 10, the upper and lower auxiliary ribs 42c and 42d may protrude from the inner surface of the door 32 by a same protruding distance as the third protruding distance (maximum protruding distance) of the vertical ribs 42a and 42b. The upper auxiliary rib 42c may be positioned between the upper portion of the sealing rib 45 and the uppermost one of the reinforcing ribs 46 in the vertical direction. The lower auxiliary rib 42d may be positioned between the lower portion of the sealing rib 45 and the lowermost one of the reinforcing ribs 46 in the vertical direction. The lower end portions of the vertical ribs 42a and 42b and the lower end portion of the lower auxiliary rib 42d connected to the lower portion of the sealing rib 45 may be recessed to have the same protruding distance as the first protruding distance of the sealing rib 45.

The third soundproof device 43 may include three oblique ribs 43a, 43b and 43c and a vertical rib 43d. The three oblique ribs 43a, 43b and 43c may extend within a region between the rear side vertical rib 2b of the second soundproof device 42 and the rear portion of the sealing rib 45 in such a manner that they are inclined downward in the rear direction. The three oblique ribs 43a, 43b and 43c may extend parallel to each other and may protrude from the inner surface of the door 32 by a same protruding distance as the third protruding distance (maximum protruding distance) of the vertical ribs 42a and 42b. The vertical rib 43d may extend vertically to intersect with the three oblique ribs 43a, 43b and 43c. The upper end portion and the lower end portion of the vertical rib 43d may be respectively connected to the upper portion and the lower portion of the sealing rib 45 and may be recessed to have the same protruding distance as the first protruding distance of the sealing rib 45. An auxiliary rib 43e and an auxiliary rib 43f may be respectively positioned on the front side and the rear side of the vertical rib 43d and may extend parallel to the vertical rib 43d, so that the auxiliary ribs 43e and 43f may intersect with the three oblique ribs 43a, 43b and 43c. The vertical rib 43d and the auxiliary ribs 43e and 43f may protrude from the inner surface of the door 32 by a same protruding distance as the third protruding distance (maximum protruding distance) of the vertical ribs 42a and 42b (i.e., the same protruding distance as the three oblique ribs 43a, 43b and 43c).

As described above, the first soundproof device 41 positioned on the front side of the spindle 3 and the second soundproof device 43 positioned on the rear side of the spindle 3 of the first to third soundproof devices 41 to 43 may be largely different from each other with respect to the lengths, heights (protruding distances) and arrangements of their ribs. With the first to third soundproof devices 41 to 43 each constituted by a combination of various ribs protruding from the inner surface of the door 32 and having different lengths, heights and arrangements as noted above, it may be possible to reduce unpleasant noise or abnormal sound, such as sound of "pea", generated by the rotation (mainly during the idle rotation) of the blade 11A. As a result, it may be possible to improve the operability and the usability of the machining device 1.

If the blade 11A rotates at some specific rotational speed, the frequency of air vibration generated within the blade cover 30 by the movement of tips of the blade 11A may become to be equal to or near a natural system frequency determined by the weight of the blade 11A, the shape of the blade cover 30, etc., so that resonance of air vibration with the system may be caused to generate unpleasant noise or abnormal sound. It has been confirmed that the resonance sound reduction device 40 of the above embodiment may efficiently inhibit or reduce the air vibration having the specific frequency and generated within the blade cover 30 by the rotation of the blade 11A. Therefore, so that resonance of the air vibration with the blade 11A can be inhibited to reduce unpleasant noise or abnormal sound, such as sound of "pea." It may be considered that the ribs of the resonance sound reduction device 40 may inhibit or reduce generation of air vibration in the blade cover 3, resulting in that the amplitudes at anti-nodes of the waveform of the air vibration may be reduced to inhibit the resonance. It has been also confirmed that the ribs having different lengths, heights or extending directions as in the first to third soundproof devices 41 to 43 can effectively perform a soundproof function.

Figure 9:
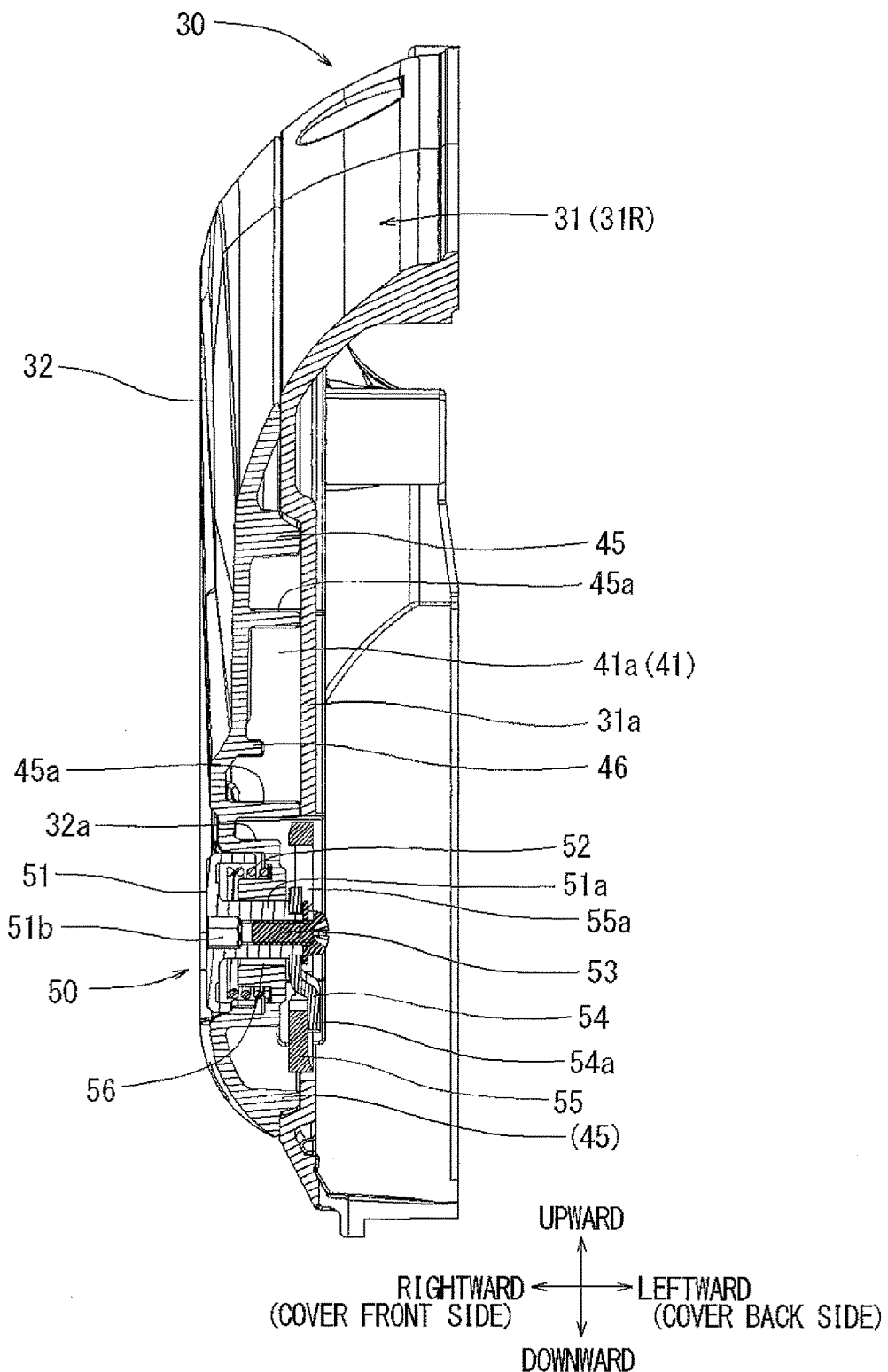
FIG. 9 is a sectional view taken along line (IX)-(IX) passing through a rotation center of an operation member in FIG. 8 and showing the right side portion of the blade cover and the door in the closing position in a vertical sectional view.

The blade cover 30 may include a lock device 50 that can lock the door 32 at a closing position against the cover main body 31. As shown in FIGS. 1, 2, 6 and 7, the lock device 50 may include an operation member 51. The operation member 51 may have a plate-shape, in particular, a circular-disk shape. The operation member 51 may be pushed (depressed) and rotated by the user as will be explained later. As shown in FIG. 9, the operation member 51 may be received within a receiving recess 32a formed in the cover front side surface (the right side surface) of the lower portion of the door 32. A support shaft 51a may be integrated with the operation member 51 at a central position of the cover back side surface (the left side surface) of the operation member 51. The operation member 51 may be supported within the receiving recess 32a via the support shaft 51a such that the operation member 51 can move in the axial direction of the support shaft 51a and can rotate about the axis of the support shaft 51a. A compression coil spring 52 may be interposed between the operation member 51 and the bottom portion of the receiving recess 32a while a washer may be interposed between the compression coil spring 52 and the bottom portion of the receiving recess 32a. In this way, the operation member 51 may be normally biased in the cover front surface direction (the right direction).

A cylindrical member or a pin 56 may be fitted into an insertion hole that may be formed in the bottom portion of the receiving recess 32a for inserting the support shaft 51a. The pin 56 may be made of resilient material, such as rubber, so that the pin 56 may be resiliently pressed against the outer surface of the support shaft 51a to apply an adequate resistance against the axial movement and against the rotation of the support shaft 51a and the operation member 51 integrated with the support shaft 51a. Therefore, the operation member 51 may be prevented from rattling and accidental displacement that may be caused by vibration, etc. More specifically, two grooves for engagement with the pin 56 may be formed in the outer surface of the support shaft 51a at positions corresponding to a lock position and an unlock position. Therefore, when the operation member 51 is positioned at the lock position or the unlock position, the pin 56 may engage the corresponding groove of the support shaft 51a, so that the operation member 51 may be locked at the lock position or the unlock position. In this way, it may be possible to reliably hold the door 32 at the closing position.

An end portion of the support shaft 51a opposite to the operation member 51 may protrude toward the side of the cover main body 31 (i.e., the cover back side) through the insertion hole of the bottom portion of the receiving recess 32a. A lock plate 54 may be attached to the protruding end portion of the support shaft 51a. A fixing screw 53 may threadably engage the protruding end portion and may be tightened to fix the lock plate 54 in position relative to the support shaft 51a for preventing the lock plate 54 from being removed from the support shaft 51a and from rotation relative to the support shaft 51a. The lock plate 54 may limit the moving end position of the operation member 51 on the right side (i.e., the cover front side) to such a position that may inhibit the user from directly rotating the operation member 51 by pinching the operation member 51 with his fingertips.

Figure 8:
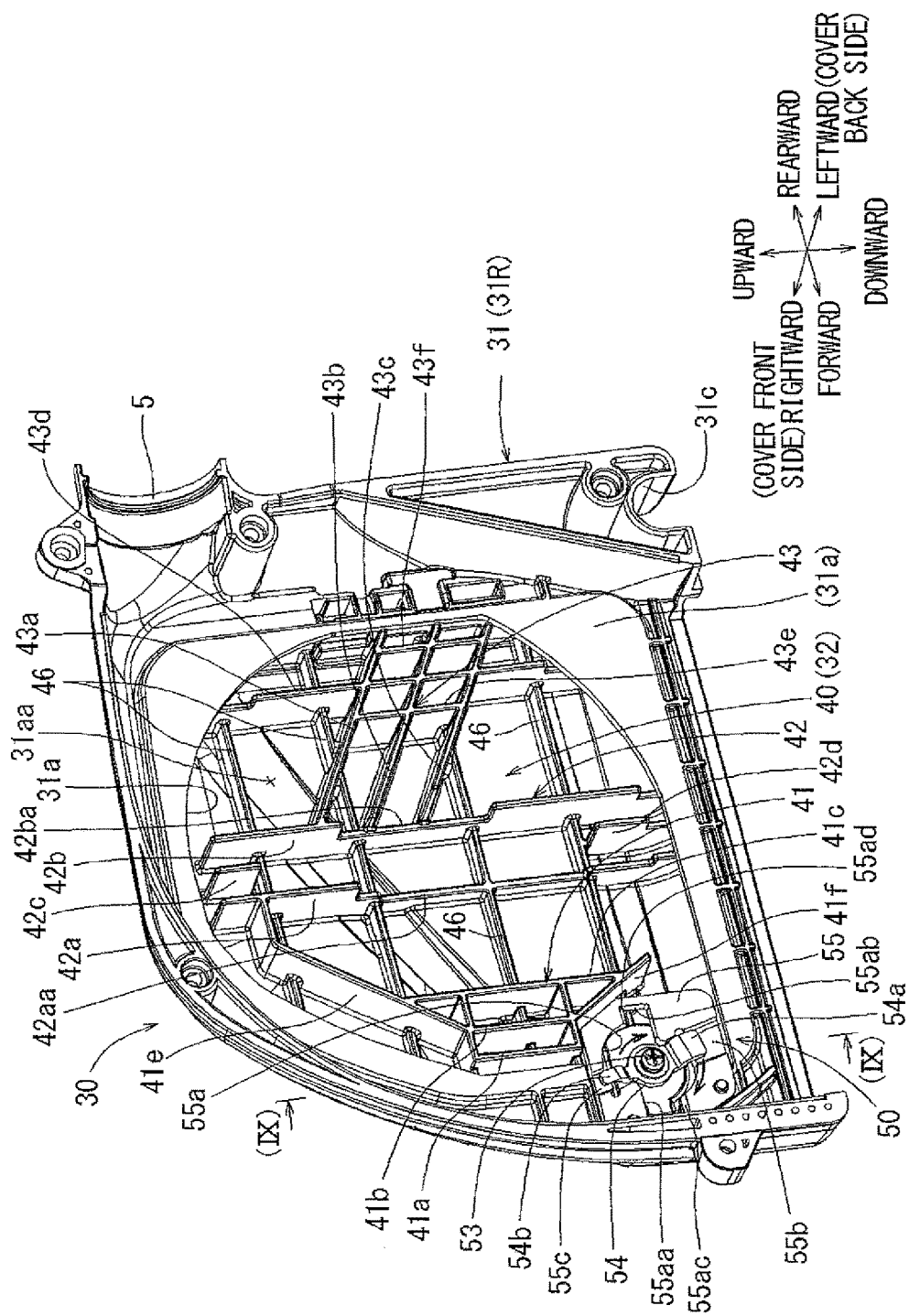
FIG. 8 is a perspective view of the blade cover with a left side portion removed and showing a right side portion of the blade cover and the door in the closing position as viewed from a back surface side.

A hexagonal engaging hole 51b may be formed in the central portion of the right surface (cover front side surface) of the operation member 51. The hexagonal wrench 18 may be retained by the front grip 4 such that the hexagonal wrench 18 can be detached from the front grip 4 for engagement with the engaging hole 51b. Rotating the hexagonal wrench 18 engaged with the engaging hole 51b can rotate the operational plate 51 together with the support shaft 51a and the lock plate 54. As shown in FIGS. 2, 7 and 8, the lock plate 54 may have a first engaging claw 54a and a second engaging claw 54b having different widths in the circumferential direction of the lock plate 54 from each other. The width of the first engaging claw 54a positioned on the right side (cover front side) in FIGS. 2 and 7 may be larger than that of the second engaging claw 54b positioned on the left side (cover back side). The first and second engaging claws 54a and 54b may extend in opposite directions to each other.

As shown in FIGS. 2, 7 and 8, a lock accommodation member 55 may be disposed at the right side portion (cover front side portion) of the cover main body 31. More specifically, the lock accommodation member 55 may be fixedly attached to the right side portion of the right side portion 31R of the cover main body 31 by using two screws 57. As shown in FIG. 8, an insertion slot 55a having a substantially key-hole shape may be formed in the lock accommodation member 55 for allowing passage of the lock plate 54. The insertion slot 55a may include a front claw passage slot portion 55aa and a rear claw passage slot portion 55ab. The front claw passage slot portion 55a may be configured to allow passage of the first engaging claw 54a having a larger width. The rear claw passage slot portion 55ab may be configured to allow passage of the second engaging claw 54b having a smaller width. The lock accommodation member 55 may further include a first lock retaining portion 55b and a second lock retaining portion 55c for engaging the first engaging claw 54a and the second engaging claw 54b, respectively. The first lock retaining portion 55b and the second lock retaining portion 55c may be formed by concaving the lock accommodation member 55 in the cover front side direction (toward the back surface of the lock plate 54).

As shown in FIGS. 1 and 6, a lock mark 37 and an unlock mark 38 may be marked on or affixed to the right side surface (cover front side surface) of the door 32 on the outer circumferential side of the operation member 51. The lock mark 37 may be positioned on the front side of the operation member 51, and the unlock mark 38 may be displaced from the lock mark 37 by an angle of about 105 degrees in the counterclockwise direction about the rotational axis of the operation member 51. In this embodiment, the lock mark 37 includes a design of a padlock in a lock state, and the unlock mark 38 includes a design of a padlock in an unlock state. Therefore, the user can easily distinguish between the lock mark 37 and the unlock mark 38 from each other at a glance. Further, a pointer 51c for pointing the lock mark 37 or the unlock mark 38 may be marked on or affixed to the operation member 51. In the state shown in FIGS. 1 and 6, the pointer 51c points the lock mark 37 to indicate that the operation member 51 is in the lock position for locking the door 32 at the closing position.

FIG. 8 shows the lock state of the lock device 50 as viewed from the inner surface side of the door 32. As shown in this figure, in the lock state, the first engaging claw 54a having a larger width is fitted into and engages the first lock retaining portion 55b positioned on the lower side, while the second engaging claw 54b having a smaller width is fitted into the second lock retaining portion 55c positioned on the upper side. In this way, the lock plate 54 may be held at the lock position.

In this embodiment, in order to release the lock state of the lock device 50 to the unlock state for opening the door 32, it may be necessary to use a specific tool (the hexagonal wrench 18 in this embodiment). Thus, the user may insert the hexagonal wrench 18 into the engaging hole 51b of the operation member 51 and depress the operation member 51 toward the bottom of the receiving recess 32a against the biasing force of the compression spring 52 by using the hexagonal wrench 18. With the operation member 51 held at the depressed state, the user may rotate the hexagonal wrench 18 to rotate the operation member 51 in the counterclockwise direction as viewed in FIGS. 1 and 6 (in the clockwise direction indicated by an arrow in FIG. 8).

Thus, as the operation member 51 is depressed toward the bottom of the circular recess 32 against the biasing force of the compression spring 52, the first and second engaging claws 54 and 54b of the lock plate 54 may move out of the first and second lock retaining portions 55b and 55c to be disengaged therefrom, thereby allowing rotation of the operation member 51. Then, with the operation member 51 held at the depressed state, the user may rotate the operation member 51 until reaching to the unlock position where the pointer 51c points the unlock mark 38 (see FIGS. 1 and 6). With this rotation of the operation member 51, the lock plate 54 may rotate together with the operation member 51 in the clockwise direction as indicated by an arrow in FIG. 8. When the lock plate 54 has reached the unlock position, the first engaging claw 54a having a larger width may be opposed to the front claw passage slot portion 55aa, while the second engaging claw 54b having a smaller width may be opposed to the rear claw passage slot portion 55ab. Therefore, in this state, the lock plate 54 is allowed for passing though the insertion slot 55a. Then, the user may release the depressing force applied to the operation member 51, so that the lock plate 54 may pass through the insertion slot 55a by the biasing force of the compression spring 52. As a result, the lock state of the lock device 50 may be released to the unlock state. At the same time, the biasing force of the torsion spring 36 may move the door 32 to open the same.

When the door 32 is opened as shown in FIG. 2, the blade 11A may be substantially entirely exposed to the outside via the access opening 31aa. Therefore, in this state, the user can easily rapidly access the blade 11A through the access opening 31aa for performing the replacement operation of the blade 11A or other necessary operations. In this way, in order to open the door 32 in this embodiment, the user is necessary to perform the depressing operation in addition to the rotational operation of the operation member 51 by using the hexagonal wrench 18. Therefore, it is possible to prevent the door 32 from being unnecessarily opened or accidentally opened, for example, by vibration applied to the door 32.

In order to close the door 32 and lock the same at the lock position, the user may pivot the door 32 to the closing position against the biasing force of the torsion spring 36.

After that, the user may insert the hexagonal wrench 18 into the engaging hole 51b of the operation member 51 and rotate the operation member 51 until reaching to the lock position. In the case of this operation, unlike the unlocking operation, it is not necessary for the user to positively apply a depressing force to the operation member 51 for moving the operation member 51 toward the bottom of the receiving recess 32a. As shown in FIG. 8, the lock accommodation member 55a may include a first claw guide 55ac and a second claw guide 55ad disposed at a position on the lower side of the front claw passage slot 55aa and at a position on the upper side of the rear claw passage slot 55ab, respectively. As the user rotates the operation member 51 toward the lock position without depressing the operation member 51 toward the bottom of the receiving recess 32a, the first engaging claw 54a and the second engaging claw 54b may be guided by the first claw guide 55ac and the second claw guide 55ad, respectively, so that the first engaging claw 54a and the second engaging claw 54b may be guided to move into the front claw passage slot 55aa and the rear claw passage slot 55ab, respectively, so as to be shifted toward the left side (back surface side) of the lock accommodation member 55. In this way, the operation member 51 may move toward the bottom of the receiving recess 32a against the biasing force of the compression spring 52.

As described above, the lock operation may require the user to only rotate the operation member 51 toward the lock position, i.e., the position where the pointer 51c points the lock mark 37, by the hexagonal wrench 18, so that the first and second engaging claws 54a and 54b may be guided by the first and second claw guides 55ac and 55ad to move into the front and rear claw passage slots 55aa and 55ab. After that, the first engaging claw 54a and the second engaging claws 54b may be resiliently fitted and engaged with the first lock retaining portion 55b and the second lock retaining portion 55c, respectively, so that the operation member 51 may be held at the lock position. As a result, the door 32 may be locked at the closing position to close the access opening 31aa. Therefore, it may be possible to prevent dust or debris produced during the groove forming operation by the rotating blade 11A from leaking or scattering to the outside of the blade cover 30.

In this way, for locking the door 43 at the closing position, i.e., for switching the lock device 50 from the unlock state to the lock state, it is only necessary for the user to rotate the operation member 51 toward the lock position without need of depressing the operation member 51 toward the bottom of the receiving recess 32a. Therefore, the lock operation can be easily performed in comparison with the unlock operation.

Figure 14:
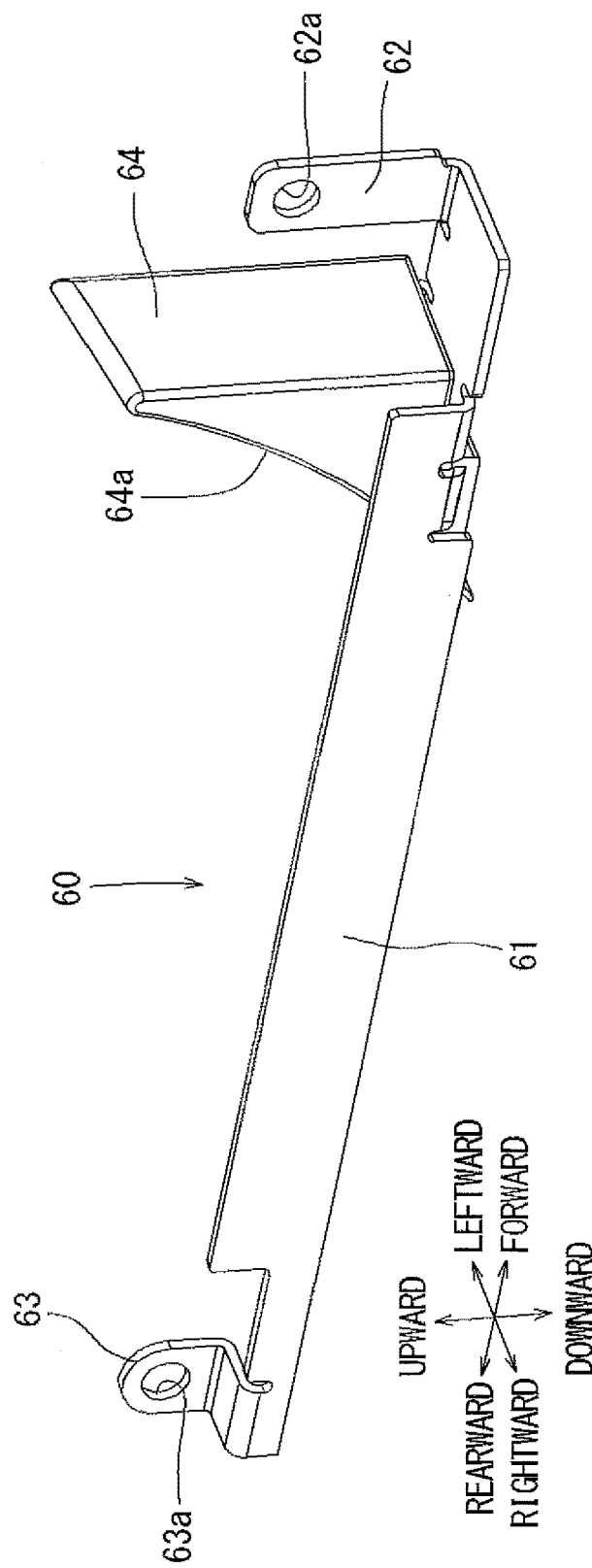
FIG. 14 is a perspective view of the dustproof device.

A dustproof device 60 shown in FIG. 14 may be attached to the lower portion of the blade cover 30. As described previously, if the workpiece W is an aluminum composite material, the elongated ruler J may be placed on an upper surface of the workpiece W and the machining device 1 may be placed on the elongated ruler J for performing a groove forming operation of the workpiece W (see FIGS. 1, 2, 4 and 6). In such a case, a gap corresponding to the thickness of the elongated ruler J may be produced between the lower edge of the blade cover 30 and the upper surface of the workpiece W. The dustproof device 60 may be serve to close the gap in the height direction (vertical direction) for preventing dust or debris generated during the groove forming operation of the aluminum composite workpiece W from leaking or scattering via the gap. On the other hand, if the workpiece W is wood or the like, the groove forming operation or the cutting operation may be performed without using the elongated ruler J. In such a case, the machining device 1 may be used in a state that the lower surface (i.e., the contact surface 2a) of the base 2 directly contacts the upper surface of the workpiece W. In this way, when the groove forming operation or the cutting operation of the wooden workpiece W is performed, there may be a relatively small gap between the lower edge of the dustproof device 60 and the upper surface of the wooden workpiece W. Therefore, it may be possible that the lower edge of the dustproof device 60 interacts with the upper surface of the wooden workpiece W. For this reason, it may be necessary to remove the dust proof device 60 from the blade cover 30. The blade 11A used for forming a groove into the upper surface of the aluminum composite workpiece W may be a so-called "groove forming blade." On the other hand, for forming a groove into the upper surface of the wooden workpiece W, a circular saw blade 11B may be used in place of the blade 11A. In general, the circular saw blade 11B may have a diameter larger than the blade 11A used for the aluminum composite workpiece W. In addition, the number of saw tips formed at the outer periphery of the circular saw blade 11B may be larger than the number of chips formed at the outer periphery of the blade 11A.

Figure 12:
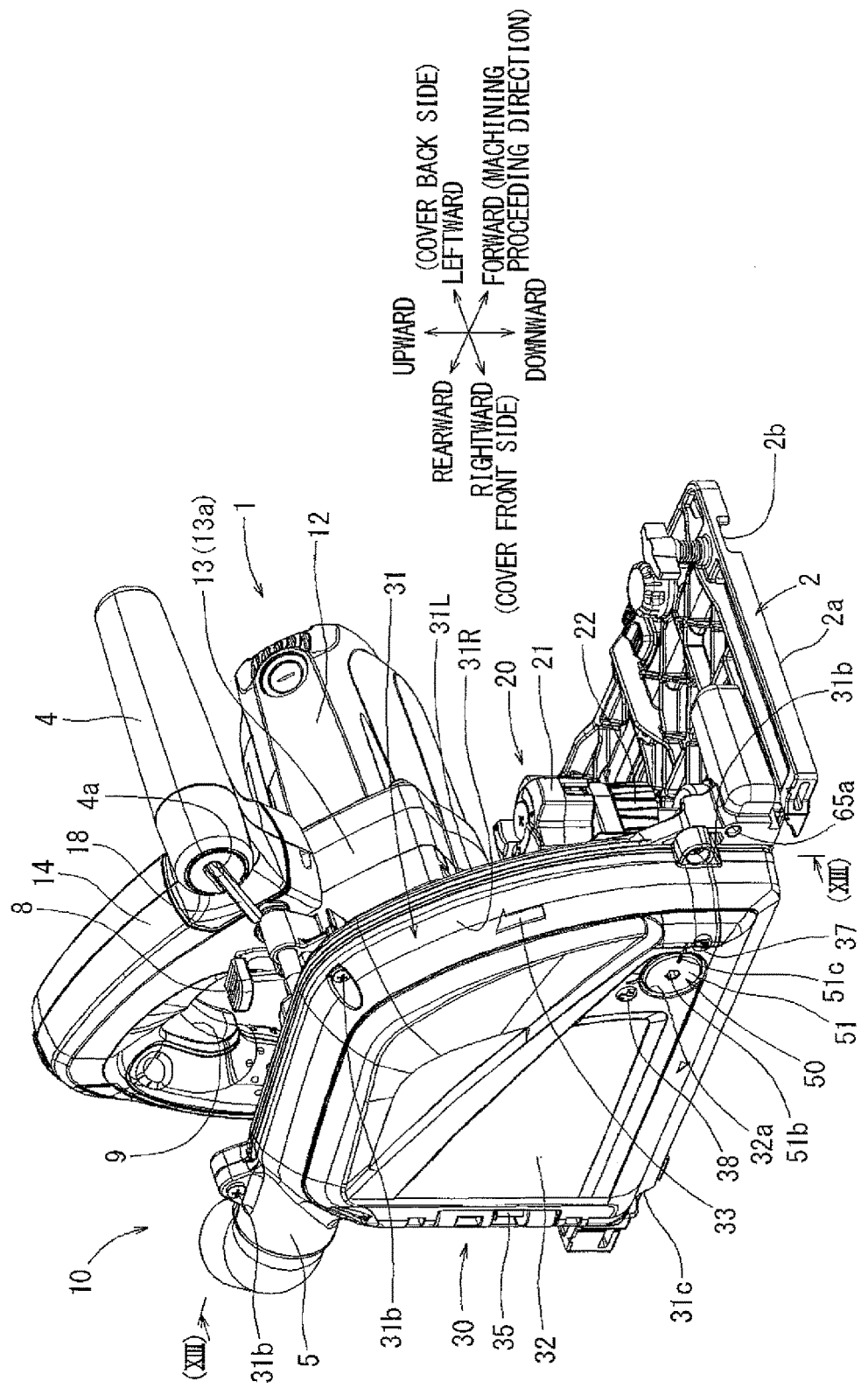
FIG. 12 is a perspective view similar to FIG. 1 but showing the state where a dustproof device has been removed.
Figure 13:
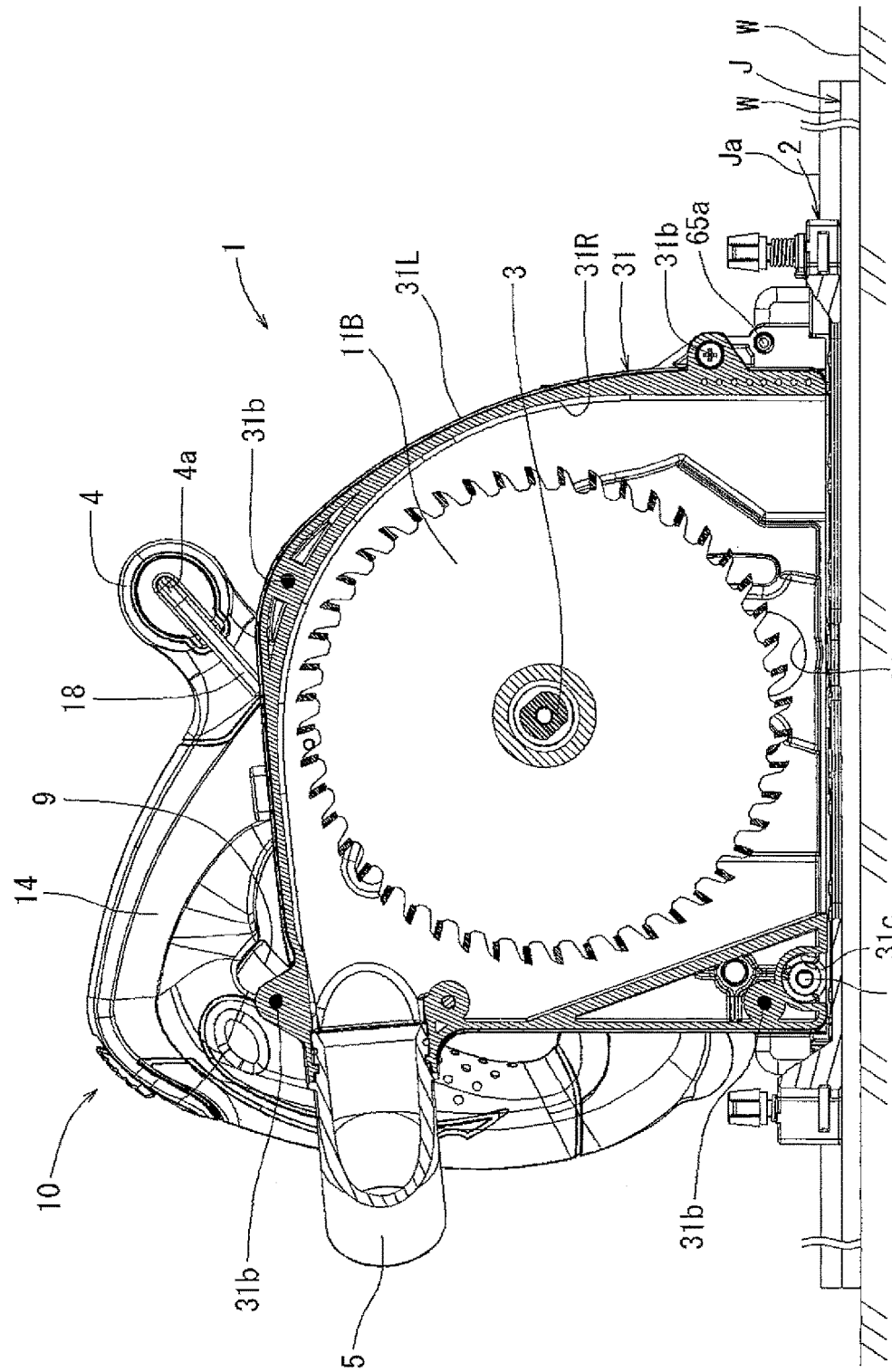
FIG. 13 is a sectional view taken along line (XIII)-(XIII) in FIG. 12 showing the machining device as viewed from the front surface side and showing the blade cover and the blade in a vertical sectional view.

FIGS. 12 and 13 show the machining device 1 in a state where the dustproof device 60 has been removed. As shown in FIG. 14, the dustproof device 60 may include a shield portion 61 that may extend vertically upward, a front attachment portion 62 and a rear attachment portion 63 respectively disposed at the front end and the rear end of the shield portion 61, and a dust guide portion 64. The shield portion 61 and the front and rear attachment portions 62 and 63 may be formed integrally with each other and may be formed by cutting and bending a metal plate, such as a steel plate. The dust guide portion 64 may be a resin molded product and may be fixedly attached to the front attachment portion 62. A dust guide surface 64a may be formed on the rear side of the dust guide portion 64 and may extend along a circular arc. As shown in FIGS. 1 and 2, the shield portion 61 may serve to close a gap formed between the lower edge of the blade cover 30 and the upper surface of the workpiece W that may extend within substantially the same plane as the contact surface 2a of the base 2.

A screw insertion hole 62a may be formed in the front attachment portion 62 for inserting a fixing screw 65. Similarly, a screw insertion hole 63a may be formed in the rear attachment portion 63 for inserting a fixing screw 66. A threaded hole 65a and a threaded hole 66a may be respectively formed in the front portion and the rear portion of the left side portion 31L of the blade cover 30. The fixing screw 65 may be inserted into the screw insertion hole 62a and engaged with and tightened into the threaded hole 65a. Similarly, the fixing screw 66 may be inserted into the screw insertion hole 63a and engaged with and tightened into the threaded hole 66a. In this way, the dustproof device 60 may be attached to the lower portion of the blade cover 30 such that the shield portion 61 extends along the lower edge of the blade cover 30.

In the attached state of the dustproof device 60, the dust guide portion 64 may extend upward into the internal space of the blade cover 30 via the lower opening of the blade cover 30. Therefore, the dust guide portion 64 may guide the dust generated at a cut portion of the workpiece W and blown upward by the rotating blade 11A such that the dust may smoothly flow upward along the dust guide surface 64a. Therefore, it may be possible to inhibit the dust from being deposited on a portion of the blade cover 30 around the cut portion of the workpiece W. Further, the dust can be efficiently discharged or collected.

As shown in FIG. 13, the threaded hole 65a may be formed in a part of the front portion of the left side portion 31L of the blade cover 30, which extends beyond the front end of the right side portion 31R. In other words, the threaded hole 65a may be formed in an externally exposed part of the blade cover 30. As shown in FIGS. 5 and 8, an upwardly recessed portion or a relief portion 31c may be formed in a rear portion of the right side portion 31R of the blade cover 30 at a position opposed to the threaded hole 66a formed in the rear portion of the left side portion 31L. Therefore, the user can tighten and loosen the fixing screw 66 through the relief portion 31c. In this way, the dustproof device 60 can be attached to and removed from the blade cover 30 in a state where the door 32 is in the closing position and where the right side portion 31R and the left side portion 31L of the blade cover 30 are joined together.

The fixing screws 65 and 66 for attaching the dustproof device 60 may be tightened and loosened by using the hexagonal wrench 41 that may be inserted into and held by the retaining hole 4a of the front grip 4. As described previously, the hexagonal wrench 41 may be used for tightening and loosening the fixing screw 3a that attaches the blade 11A (11B) to the spindle 3 and may be also used for rotating the operation member 51 of the lock device 50. In this way, the same hexagonal wrench 41 can be commonly used for three different operations. Further, as described previously, because the hexagonal wrench 18 may be detachably held at the front grip 4, the replacement operation of the blade 11A (11B) can be rapidly performed.

As shown in FIGS. 12 and 13, when the dustproof device 60 has been removed from the blade cover 30, the fixing screw 65 used for attaching the front attachment portion 62 of the dustproof device 60 may be removed from the threaded hole 65a. In this state, the user can easily visually recognize the position of the threaded hole 65a. Further, in this state, no dust guide portion 64 may be positioned on the front side of the blade 11B as a result of removal of the dustproof device 60.

With the machining device 1 according to the above embodiment, air vibration generated by the rotation of the blade 11 may be inhibited or reduced by the resonance sound reduction device 40 disposed at the inner surface of the door 32, so that it may be possible to reduce unpleasant noise or abnormal sound (resonance sound), such as sound of "pea." In the above embodiment, the resonance sound reduction device 40 may include a plurality of ribs. The lengths, heights (protruding distances) and arrangements of the ribs may be suitably determined to reduce amplitudes at anti-nodes of a waveform of the air vibration.

For example, the first soundproof device 41 of the resonance sound reduction device 40 may include the vertical ribs 41a, 41b and 41c extending parallel to each other, the horizontal ribs 41d orthogonally intersecting with the vertical ribs, and the oblique ribs 41e and 41f obliquely intersecting with the vertical ribs 41b and 41c. The second soundproof device 42 may include two vertical ribs 42a and 42b that are considerably different in length from the vertical ribs 41a, 41b and 41c of the first soundproof device 41. The vertical ribs 42a and 42b may respectively have the recessed portions 42aa and 42ba formed at substantially middle positions in the vertical direction and each having a smaller protruding distance. The third soundproof device 43 may include three oblique ribs 43a, 43b and 43c extending parallel to each other. The third soundproof device 43 may include only one vertical rib, i.e., the vertical rib 43d, that may intersect with the oblique ribs 43a, 43b and 43c. With these variously configured and variously arranged ribs, amplitudes at anti-nodes of a waveform of air vibration may be reduced to reduce generation of noise or abnormal sound.

Further, according to the above embodiment, the lock device 50 may be provided for locking the door 32 at the closing position. The lock device 50 may include the operation member 51 that can be rotated for locking and unlocking the door 32. A specific tool, such as the hexagonal wrench 18, may be used for performing the operation of the operation member 51. Therefore, it may be possible to prevent an accidental or unintentional unlock operation of the lock device 50 and to reliably maintain the closing state of the door 32.

The above embodiment may be modified in various ways. For example, although the ribs of each of the first to third soundproof devices 41 to 43 of the resonance sound reduction device 40 are configured to have shapes of flat plates, it may be possible to configure the ribs to have shapes of corrugated plates. Furthermore, the protruding distance (height), length and oblique angle (in the case of the oblique ribs), etc. of each of the ribs may be determined to be different from the other ribs. Further, the ribs may be replaced with any other convex portions, such as cylindrical projections, each having a shape different from a flat plate. Alternatively, the ribs may be replaced with concave portions, such as grooves or slots. Furthermore, it may be possible to combine variously shaped convex portions and/or variously shaped concave portions for use as the soundproof device.

Furthermore, although the resonance sound reduction device 40 may include three soundproof devices (i.e., the first to third soundproof devices 41 to 43) in the above embodiment, it may be possible to include four or more soundproof devices arranged at different positions. It may be also possible to include only one soundproof device or two soundproof devices.

Furthermore, although the soundproof devices are formed integrally with the inner surface of the door 32 in the above embodiment, it may be possible to configure the soundproof devices as separate devices from the door 32 for attachment to the door 32. In such a case, any suitable soundproof members or vibration absorbing members that may be made from materials other than that of the door 32 may be used to form the soundproof devices. In this way, the sound proof device may be of any structure or may be made from any material as long as it can reduce amplitudes at anti-nodes of a waveform of air vibration produced within the blade cover by the rotating blade in order to reduce generation of noise or abnormal sound at a specific frequency.

Furthermore, in the above embodiment, the blade cover 30 includes the door 32, and the resonance sound reduction device 40 including the first to third soundproof devices 41 to 43 is disposed at the inner surface of the door 32. However, the above teachings may be also applied to a blade cover having no door. In such a case, the resonance sound reduction device 40 may be disposed at an inner surface of a right side wall (i.e. a wall on the cover front side) of a blade cover.

Furthermore, although the hexagonal wrench 18 is used as a specific tool for rotating the operation member 51 of the lock device 50 in the above embodiment, any other tools may be used as such a specific tool. For example, a cross-slot screwdriver or any other general purpose hand tools may be used. It may be also possible to use a specifically designed hand tool that may not be used for any other operations than the operation of the operation member 51.

Further, although the above embodiment has been described in connection with the machining device 1 configured as a hand-held groove cutter as an example, the above teachings may be applied to any other machining devices having a rotary blade and a blade cover. For example, the above teachings may be applied to the following different types of machining devices:

Type A: Portable machining devices having a base, a rotary blade movably or pivotally supported by the base, and a blade cover fixedly attached to the base. (The hand-held groove cutter of the above embodiment, and a circular saw called a "plunge circular saw" may belong to this type of portable machining devices.)

Type B: Portable machining devices having a base, a rotary blade movably or pivotally supported by the base, and a blade cover movable or pivotable relative the base together with the blade. (An ordinary circular saw and an ordinary grove cutter may belong to this type of portable machining devices.)

Type C: Table-type or stationary-type machining devices having a table or a stationary base, a rotary blade movably or pivotally supported by the table or the base, and a blade cover movable or pivotable relative the table or the base together with the blade. (A miter saw and a slide miter saw may belong to this type of machining devices.)

Although some of the machining devices of type B and C may have a movable cover movable relative to a fixed cover for partly uncovering the blade during a cutting operation, the problem of noise or abnormal sound generated by the rotating blade may also occur during an idle rotation of the blade, i.e., when the blade rotates idle while the movable cover is closed to cover the blade by both of the fixed cover and the movable cover.

Representative, non-limiting examples were described above in detail with reference to the attached drawings. The detailed description is intended to teach a person of skill in the art details for practicing aspects of the present teachings and thus is not intended to limit the scope of the invention. Furthermore, each of the additional features and teachings disclosed above may be applied and/or utilized separately or in conjunction with other features and teachings to provide improved machining devices, and methods of making and using the same.

Moreover, the various combinations of features and steps disclosed in the above detailed description may not be necessary to practice the invention in the broadest sense, and are instead taught to describe representative examples of the invention. Further, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed as informational, instructive and/or representative and may thus be construed separately and independently from each other. In addition, all value ranges and/or indications of groups of entities are also intended to include possible intermediate values and/or intermediate entities for the purpose of original written disclosure, as well as for the purpose of restricting the claimed subject matter.

What is claimed is:

1. A machining device comprising:
an electric motor;
a blade rotatably driven by the electric motor for machining a workpiece;
a blade cover configured to surround the blade; and
a resonance sound reduction device disposed at the blade cover and configured to reduce air vibration generated by the rotation of the blade, wherein
the resonance sound reduction device is further configured to reduce amplitudes at anti-nodes of a waveform of the air vibration,
the resonance sound reduction device comprises a combination of a plurality of differently shaped portions, and
at least two of the differently shaped portions are configured to have different heights in a direction toward the blade.

2. The machining device according to claim 1, wherein the resonance sound reduction device comprises at least one convex portion.

3. The machining device according to claim 2, wherein the resonance sound reduction device comprises at least one linear projection.

4. The machining device according to claim 1, wherein at least two of the differently shaped portions are arranged to cross each other.

5. The machining device according to claim 4, wherein the at least two of the differently shaped portions are arranged to cross orthogonally each other.

6. The machining device according to claim 1, further comprising a spindle rotatably driven by the electric motor, wherein:
the blade is attached to the spindle, so that the blade rotates about an axis of the spindle;
the differently shaped portions include a front side portion and a rear side portion position on a front side and a rear side, respectively, with respect to the spindle axis.

7. A machining device comprising:
an electric motor;
a blade rotatably driven by the electric motor for machining a workpiece;
a blade cover configured to surround the blade;
a resonance sound reduction device disposed at the blade cover and configured to reduce air vibration generated by the rotation of the blade;
a door configured to be capable of opening and closing an access opening formed in the blade cover; and
a lock device configured to lock the door at a closing position for closing the access opening; wherein:
the lock device comprises an operation member and a biasing device;
the operation member is configured to be rotatable relative to the door about a rotational axis and movable relative to the door along a movement axis;
the biasing device is configured to bias the operation member in a first direction along the movement axis; and
the lock device is configured to unlock the door when the operation member is rotated after being depressed in a second direction opposite to the first direction.

8. A machining device comprising:
a base;
a machining device body and a blade cover each supported by the base so as to be positioned on an upper side of the base;
wherein the machining device body includes an electric motor and a blade rotatably driven by the electric motor for machining a workpiece; and
wherein the blade cover is configured to surround the blade; and a resonance sound reduction device disposed at the blade cover and configured to reduce air vibration generated by the rotation of the blade, wherein the resonance sound reduction device comprises at least one soundproof device including a plurality of ribs that are disposed at at least one of inner surfaces of the blade cover opposed to each other in an axial direction of the rotational axis of the blade, the resonance sound reduction device comprises a first soundproof device, a second soundproof device and a third soundproof device each including a plurality of ribs, the second soundproof device is opposed to a substantially central portion of the blade, and the first sound proof device and the third soundproof device are disposed on opposite sides of the second soundproof device in a diametrical direction of the rotational axis of the blade.

9. The machining device according to claim 8, wherein the resonance sound reduction device is further configured to reduce amplitudes at anti-nodes of a waveform of the air vibration.

10. The machining device according to claim 8, wherein the plurality of ribs are formed integrally with the at least one of inner surfaces of the blade cover.

11. The machining device according to claim 8, wherein:
the first soundproof device is disposed on a front side of the third soundproof device with respect to a moving direction of the machining device for machining the workpiece.

12. A machining device comprising:
a base;
a machining device body and a blade cover each supported by the base so as to be positioned on an upper side of the base;
  wherein the machining device body includes an electric motor and a blade rotatably driven by the electric motor for machining a workpiece, and
  wherein the blade cover is configured to surround the blade; and
a resonance sound reduction device disposed at the blade cover and configured to reduce air vibration generated by the rotation of the blade, wherein
the resonance sound reduction device comprises at least one soundproof device including a plurality of ribs that are disposed at at least one of inner surfaces of the blade cover opposed to each other in an axial direction of the rotational axis of the blade, the blade cover further includes an access opening formed in one of the inner surfaces, and a door configured to be capable of opening and closing the access opening; and the at least one soundproof device is disposed at an inner surface of the door.

13. A machining device comprising:
an electric motor;
a blade rotatably driven by the electric motor for machining a workpiece;
a blade cover configured to surround the blade; and
a resonance sound reduction device disposed at the blade cover and configured to reduce air vibration generated by the rotation of the blade, wherein
the resonance sound reduction device comprises a plurality of linear projections formed on an inner surface of the blade cover facing the blade in a direction of a rotational axis of the blade, and
the plurality of linear projections extend in different directions from each other along the inner surface of the blade cover to intersect with each other.

14. A machining device comprising:
a base;
a machining device body and a blade cover each supported by the base so as to be positioned on an upper side of the base,
  wherein the machining device body includes an electric motor and a blade rotatably driven by the electric motor for machining a workpiece; and
  wherein the blade cover is configured to surround the blade; and
a resonance sound reduction device disposed at the blade cover and configured to reduce air vibration generated by the rotation of the blade, wherein:
the resonance sound reduction device comprises at least one soundproof device including a plurality of ribs that are disposed at at least one of inner surfaces of the blade cover opposed to each other in an axial direction of the rotational axis of the blade,
the plurality of ribs are formed integrally with the at least one of inner surfaces of the blade cover, and
the plurality of ribs extend linearly in different directions from each other along the at least one of the inner surfaces of the blade cover to intersect with each other.

* * * * *